United States Patent [19]

Saotome et al.

[11] Patent Number: 5,115,132

[45] Date of Patent: May 19, 1992

[54] RADIATION IMAGE RECORDING AND READ-OUT APPARATUS

[75] Inventors: Shigeru Saotome; Masamitsu Ishida, both of Kanagawa, Japan

[73] Assignee: Fuji Photo Film Co., Ltd., Kanagawa, Japan

[21] Appl. No.: 464,669

[22] Filed: Jan. 11, 1990

Related U.S. Application Data

[63] Continuation of Ser. No. 182,682, Apr. 18, 1988, abandoned.

[30] Foreign Application Priority Data

Apr. 17, 1987 [JP] Japan .................................. 62-94545
Apr. 17, 1987 [JP] Japan .................................. 62-94555

[51] Int. Cl.⁵ .............................................. G03B 42/02
[52] U.S. Cl. ................................. 250/327.2; 250/484.1
[58] Field of Search ................. 250/327.2 B, 327.2 C, 250/327.2 J, 484.1 B; 378/175, 177, 182

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,820,922 | 4/1989 | Nakajima | 250/327.2 |
| 4,835,386 | 5/1989 | Shimura et al. | 250/327.2 |

FOREIGN PATENT DOCUMENTS

| | | | |
|---|---|---|---|
| 0178674 | 4/1986 | European Pat. Off. | 250/327.2 |
| 0220629 | 5/1987 | European Pat. Off. | 250/327.2 |
| 61-98340 | 5/1986 | Japan | 250/327.2 |

*Primary Examiner*—Constantine Hannaher
*Attorney, Agent, or Firm*—Sughrue, Mion, Zinn, Macpeak & Seas

[57] ABSTRACT

A radiation image recording and read-out apparatus comprises a recording and read-out unit for recording a radiation image on a stimulable phosphor sheet and reading the radiation image therefrom, a shutter moveable between a masking position that prevents impingement of radiation upon a part of the stimulable phosphor sheet and a retracted position that allows impingement of radiation upon a single image recording region of the stimulable phosphor sheet, and a shutter operating device for moving the shutter between the masking position and the retracted position. The recording and read-out unit is moved by a unit movement device to move the stimulable phosphor sheet in the same plane at an image recording position in the recording and read-out unit. A system is provided for operating the shutter operating device to move the shutter to the masking position, and operating the unit movement device to move the recording and read-out unit so that the uncovered portion of the stimulable phosphor sheet at the image recording position that is not covered by the shutter changes sequentially.

2 Claims, 14 Drawing Sheets

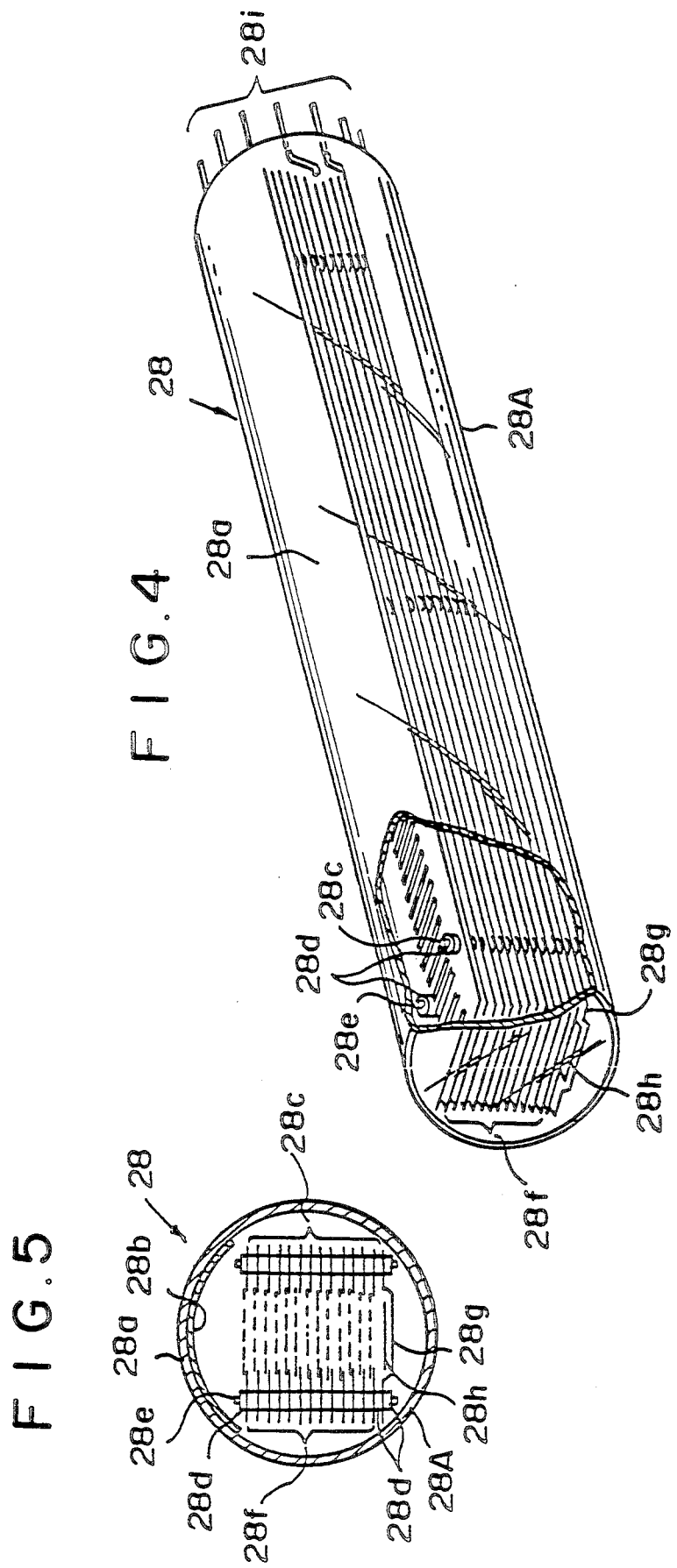

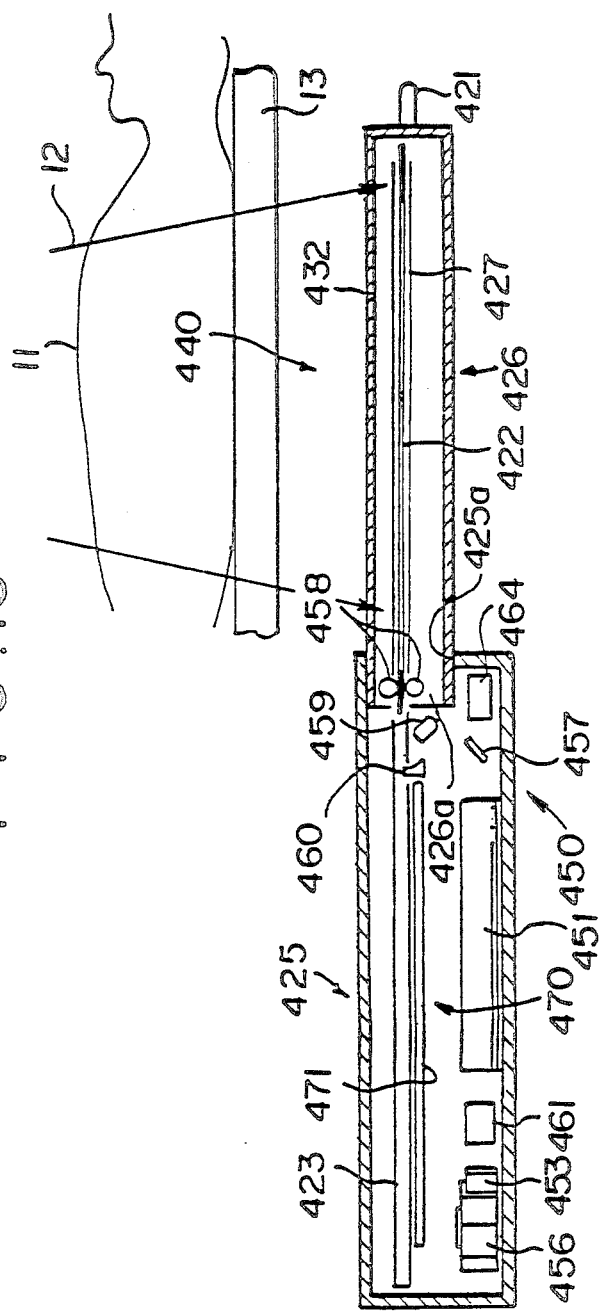
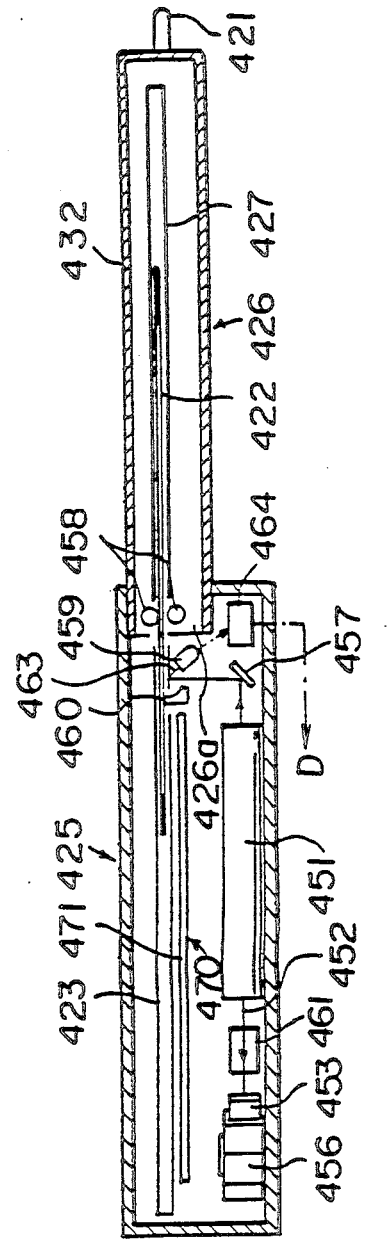

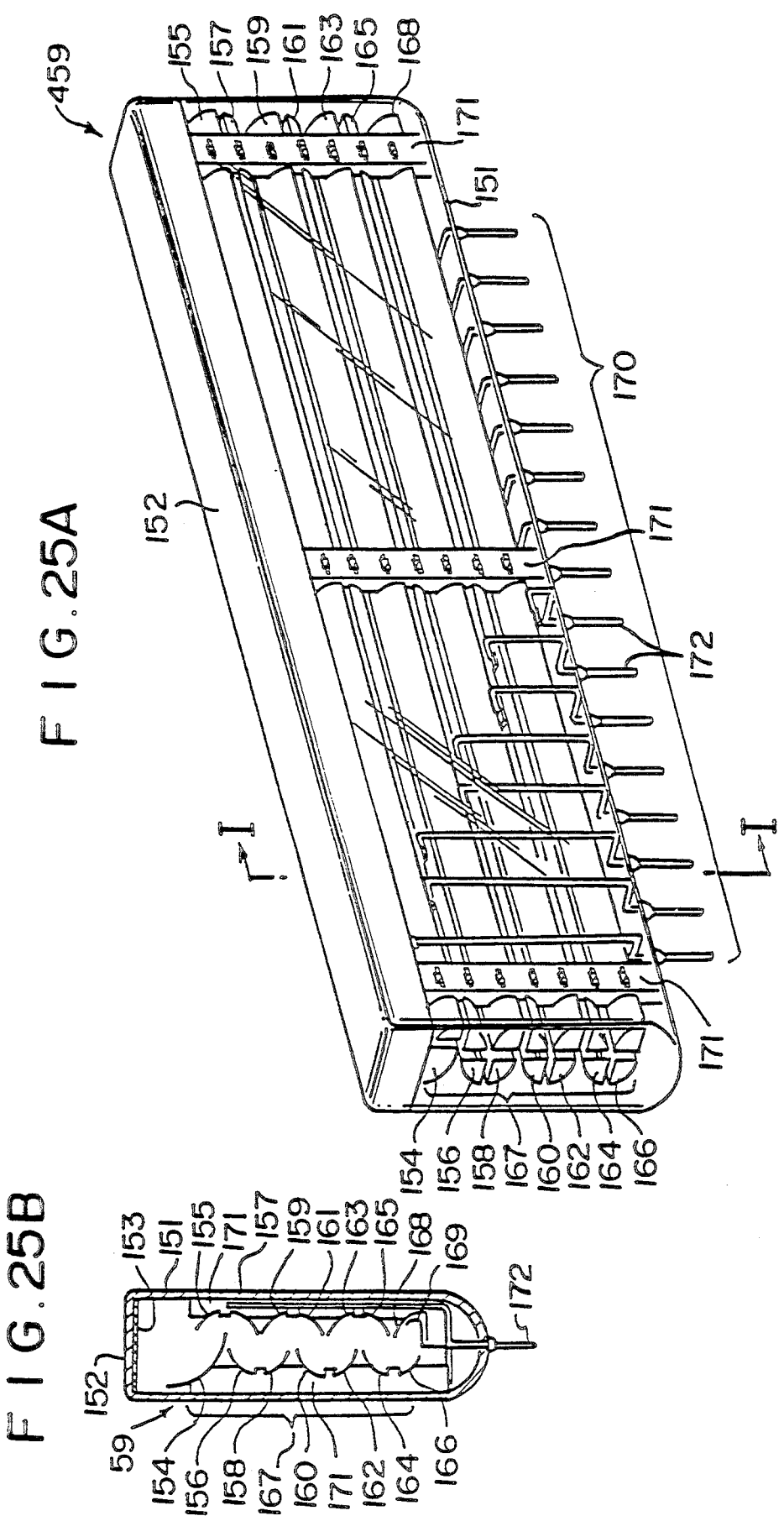

RADIATION IMAGE RECORDING AND READ-OUT APPARATUS

This is a continuation of application Ser. No. 07/182,682, filed Apr. 18, 1988 now abandoned.

BACKGROUND OF THE INVENTION

1. Field of the Invention

This invention relates to a radiation image recording and read-out apparatus for recording a radiation image of an object, and reading out the radiation image to obtain electric image signals. This invention particularly relates to a radiation image recording and read-out apparatus wherein a radiation image is recorded on a stimulable phosphor sheet capable of storing the radiation energy, and subdivision image recording on the stimulable phosphor sheet is carried out easily.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to electric image signals, which are processed as desired to reproduce a visible image having an improved image quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom on a final recording medium. For economical reasons, therefore, it is desirable that the stimulable phosphor sheet be used repeatedly.

In order to reuse stimulable phosphor sheets as mentioned above, the radiation energy remaining on the stimulable phosphor sheet after it is scanned with stimulating rays to read out the radiation image stored thereon should be erased by exposing the stimulable phosphor sheet to light or heat as described in, for example, U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed in Japanese Unexamined Patent Publication No. 59(1984)-192240 which corresponds to U.S. application Ser. No. 037,119 (Con. Appln. of U.S. Ser. No. 600,689), now U.S. Pat. No. 4,851,679 a radiation image recording and read-out apparatus comprising:

i) a circulation and conveyance means for conveying at least one stimulable phosphor sheet for recording a radiation image thereon along a predetermined circulation path, ii) an image recording section disposed on the circulation path for recording a radiation image of an object on the stimulable phosphor sheet by exposing the stimulable phosphor sheet to a radiation passing through the object, iii) an image read-out section disposed on the circulation path and provided with a stimulating ray source for emitting stimulating rays for scanning the stimulable phosphor sheet carrying the radiation image stored thereon at the image recording section, and a photoelectric read-out means for detecting light emitted by the stimulable phosphor sheet scanned with the stimulating rays to obtain electric image signals, and iv) an erasing section disposed on the circulation path for, prior to the next image recording on the stimulable phosphor sheet for which the image read-out has been carried out at the image read-out section, having the stimulable phosphor sheet release the radiation energy remaining on the stimulable phosphor sheet, whereby the stimulable phosphor sheet is circulated through the image recording section, the image read-out section and the erasing section, and reused for radiation image recording. With the radiation image recording and read-out apparatus having such a configuration, the radiation image recording and read-out can be carried out sequentially and efficiently.

On the other hand, in the medical diagnosis, it is often desired to record two images of the same object under different conditions and/or by use of different image recording methods and to compare the two images, for example, as in the case where a front image and a side image of the human body are to be recorded or in the case where a set of images such as images prior to and after the injection of contrast media are to be recorded. In this case, it is desired that the two images be recorded on halves of a single stimulable phosphor sheet. With the aforesaid radiation image recording and read-out apparatus, even though the two images are recorded respectively on different stimulable phosphor sheets, the two images can be reproduced side by side on a single recording medium or on a single display device at the time of image reproduction. However, in order to efficiently utilize the stimulable phosphor sheet (to reduce the running cost) and to shorten the processing time, the two images should preferably be recorded respectively on halves of a single stimulable phosphor sheet in the course of image recording.

Also, besides the case of the recording of a set of images, the image recording region on a single stimulable phosphor sheet should preferably be divided into two or more subdivisions, and the image recording should preferably be carried out at the respective subdivisions, thereby to reduce the running cost.

Accordingly, the applicant proposed in Japanese Unexamined Patent Publication No. 61(1986)-98340 which corresponds to U.S. application Ser. No. 789,259, now U.S. Pat. No. 4,820,922 a radiation image recording and read-out apparatus wherein the stimulable phosphor sheet is circulated and conveyed and the subdivision image recording is carried out easily. The proposed radiation image recording and read-out apparatus comprises the aforesaid circulation and conveyance means for the stimulable phosphor sheet, the image recording section, the image read-out section, the erasing section, a shutter provided between the stimulable phosphor sheet at the image recording section and a radiation source for partially preventing the radiation from impinging upon the stimulable phosphor sheet in the course of the subdivision image recording, a shutter operation means for controlling the movement of the shutter, and a subdivision image recording operation means for operating the shutter operation means in accordance with a subdivision image recording instruction to move the shutter to a masking position and controlling the circulation and conveyance means to feed the stimulable phosphor sheet step-wise at the image recording section.

The aforesaid shutter is moveable between the masking position at which the shutter prevents the impingement of the radiation upon at least a part of the stimulable phosphor sheet and a retracted position at which the shutter allows impingement of the radiation upon approximately the overall area of the stimulable phosphor sheet. The shutter has a size covering at least one half of the stimulable phosphor sheet, and is formed of a material such as lead having a high radiation absorptivity.

With the proposed radiation image recording and read-out apparatus, the subdivision image recording can be carried out easily.

However, the radiation image recording and readout apparatus having the aforesaid configuration wherein the stimulable phosphor sheet is circulated and conveyed along the circulation path and sequentially sent to the image recording section, the image read-out section and the erasing section, has the drawback that the apparatus becomes large.

SUMMARY OF THE INVENTION

The primary object of the present invention is to provide a radiation image recording and read-out apparatus which facilitates subdivision image recording and which is small.

Another object of the present invention is to provide a radiation image recording and read-out apparatus which enables ordinary radiation image recording and subdivision image recording even at a place where the radiation image recording has heretofore been impossible.

The first radiation image recording and read-out apparatus in accordance with the present invention is characterized by, instead of conveying a stimulable phosphor sheet sequentially to an image recording section, an image read-out section and an erasing section along a circulation and conveyance path, providing a small recording and readout unit containing a stimulable phosphor sheet and provided with the image recording, read-out and erasing functions, and carrying out subdivision image recording by moving the whole recording and read-out unit.

Specifically, the present invention provides a first radiation image recording and read-out apparatus which comprises:
i) a recording and read-out unit provided with:
  a) a case for housing therein a stimulable phosphor sheet and having longitudinal and transverse dimensions approximately equal to the longitudinal and transverse dimensions of a single image recording area on said stimulable phosphor sheet,
  b) an image recording section for holding said stimulable phosphor sheet in said case at an image recording position exposed to radiation passing through an object, and having a radiation image of said object stored on said stimulable phosphor sheet,
  c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and
  d) an erasing section provided in said case for releasing the radiation energy remaining on said stimulable phosphor sheet, for which the detection of said emitted light has been carried out, before the image recording is carried out on said stimulable phosphor sheet,
ii) a shutter provided on a radiation incidence side with respect to said stimulable phosphor sheet held at said image recording position, having a size covering at least a part of said stimulable phosphor sheet, and moveable between a masking position at which said shutter prevents impingement of the radiation upon a part of said stimulable phosphor sheet and a retracted position at which said shutter allows impingement of the radiation upon approximately the overall area of the single image recording region of said stimulable phosphor sheet,
iii) a shutter operation means operated from the exterior for moving said shutter between said masking position and said retracted position,
iv) a unit movement means for moving said recording and read-out unit so that said stimulable phosphor sheet at said image recording position is moved approximately in the same plane, and
v) a subdivision image recording operation means for, upon receiving a subdivision image recording instruction, operating said shutter operation means to move said shutter to said masking position, and operating said unit movement means to move said recording and read-out unit so that the uncovered portion of said stimulable phosphor sheet at said image recording position that is not covered by said shutter changes sequentially.

With the first radiation image recording and readout apparatus in accordance with the present invention wherein the recording and read-out unit comprising the case having a size approximately equal to the single radiation image recording area, and the image recording section, the image read-out section and the erasing section housed in the case is used, and the subdivision image recording is carried out by moving the whole recording and read-out unit, the apparatus can be made markedly smaller and lighter than the conventional radiation image recording and read-out apparatus wherein the stimulable phosphor sheet is circulated and conveyed.

The second radiation image recording and read-out apparatus in accordance with the present invention is characterized by, instead of conveying a stimulable phosphor sheet sequentially to an image recording section, an image read-out section and an erasing section along a circulation and conveyance path, providing a small recording and readout unit containing a stimulable phosphor sheet and provided with the image recording, read-out and erasing functions, and carrying out subdivision image recording by moving the whole recording and read-out unit or by moving the stimulable phosphor sheet in the recording and read-out unit.

Specifically, the present invention also provides a second radiation image recording and read-out apparatus which comprises:

i) a recording and read-out unit provided with:
   a) a case for housing a stimulable phosphor sheet capable of storing a radiation image thereon, and provided at one case end with an opening though which a light shielding cover is to be passed,
   b) the light shielding cover housed in said case for projection out of said case through said opening for passage of the light shielding cover, and provided with a sheet passage opening at an end on the side supported by said case at the time said light shielding cover is projected out of said case,
   c) an image recording section for exposing said stimulable phosphor sheet, which is disposed at an image recording position inside of said light shielding cover projected out of said case, to radiation passing through an object, thereby to have the radiation image stored on said stimulable phosphor sheet,
   d) an image read-out section provided with a sub-scanning means for moving said stimulable phosphor sheet between said image recording position and a position in said case to which said stimulable phosphor sheet advances through said sheet passage opening, and a main scanning means for scanning said stimulable phosphor sheet by stimulating rays in a main scanning direction at a position inside of said case in the vicinity of said opening for passage of the light shielding cover, wherein said stimulable phosphor sheet carrying said radiation image stored thereon is exposed to the stimulating rays which cause said stimulable phosphor sheet to emit light in proportion to the stored radiation energy, and the emitted light is detected by a photoelectric read-out means to obtain image signals, and
   e) an erasing section for releasing the radiation energy remaining on said stimulable phosphor sheet, for which the image read-out has been carried out at said image read-out section, before the image recording is carried out on said stimulable phosphor sheet,
ii) a shutter provided on a radiation incidence side with respect to said stimulable phosphor sheet held at said image recording position, having a size covering at least a part of said stimulable phosphor sheet, and moveable between a masking position at which said shutter prevents impingement of the radiation upon a part of said stimulable phosphor sheet and a retracted position at which said shutter allows impingement of the radiation upon approximately the overall area of the single image recording region of said stimulable phosphor sheet,
iii) a shutter operation means operated from the exterior for moving said shutter between said masking position and said retracted position,
iv) a sheet movement means for subdivision image recording, said sheet movement means moving said stimulable phosphor sheet at said image recording position approximately in the same plane, and
v) a subdivision image recording operation means for, upon receiving a subdivision image recording instruction, operating said shutter operation means to move said shutter to said masking position. and operating said sheet movement means for subdivision image recording to move said stimulable phosphor sheet so that the uncovered portion of said stimulable phosphor sheet at said image recording position that is not covered by said shutter changes sequentially.

In the second radiation image recording and readout apparatus in accordance with the present invention, as the sheet movement means for subdivision image recording, it is possible to use a means for moving the whole recording and read-out unit, a means for moving the stimulable phosphor sheet in the recording and read-out unit, or a combination of the two means.

With the second radiation image recording and read-out apparatus in accordance with the present invention, the read-out of the radiation image from the stimulable phosphor sheet at the image read-out section provided with the sub-scanning means and the main scanning means can be carried out by moving the stimulable phosphor sheet from the light shielding cover, which is projected out of the case, into the case. Alternatively, in the case where the image read-out is to be carried out after the stimulable phosphor sheet has been returned into the case, the image read-out can be carried out by moving the stimulable phosphor sheet from the case into the light shielding cover projected out of the case. Specifically, the space for the movement of the stimulable phosphor sheet for the purpose of the sub-scanning is ensured by the projection of the light shielding cover out of the case. Therefore, it is only necessary that the size of the case of the recording and read-out unit be such that the light shielding cover and the stimulable phosphor sheet can be housed therein when the apparatus is out of use, and the case can be made small nearly to a size capable of housing a single stimulable phosphor sheet.

As mentioned above, with the second radiation image recording and read-out apparatus in accordance with the present invention wherein the recording and read-out unit constituted to move the stimulable phosphor sheet for sub-scanning with stimulating rays at the time of the image read-out between the position in the case and the position in the light shielding cover projected out of the case is used, the apparatus can be made very small. Therefore, the second radiation image recording and read-out apparatus in accordance with the present invention can readily be provided in a mobile X-ray diagnostic station, a ship or the like wherein it is not always possible to ensure a large space for loading with a medical diagnosis apparatus or the like, and enables ordinary radiation image recording and the subdivision image recording even at a place where the radiation image recording has heretofore been impossible, thereby to contribute to improvement of the medical diagnosis technique.

BRIEF DESCRIPTION OF THE DRAWINGS

FIGS. 25A is a perspective view showing the long photomultiplier employed in the second radiation image recording and read-out apparatus in accordance with the present invention, FIG. 25B is a sectional view taken along line I—I in FIG. 25A.

DESCRIPTION OF THE PREFERRED EMBODIMENTS

The present invention will hereinbelow be described in further detail with reference to the accompanying drawings.

Figure 1:
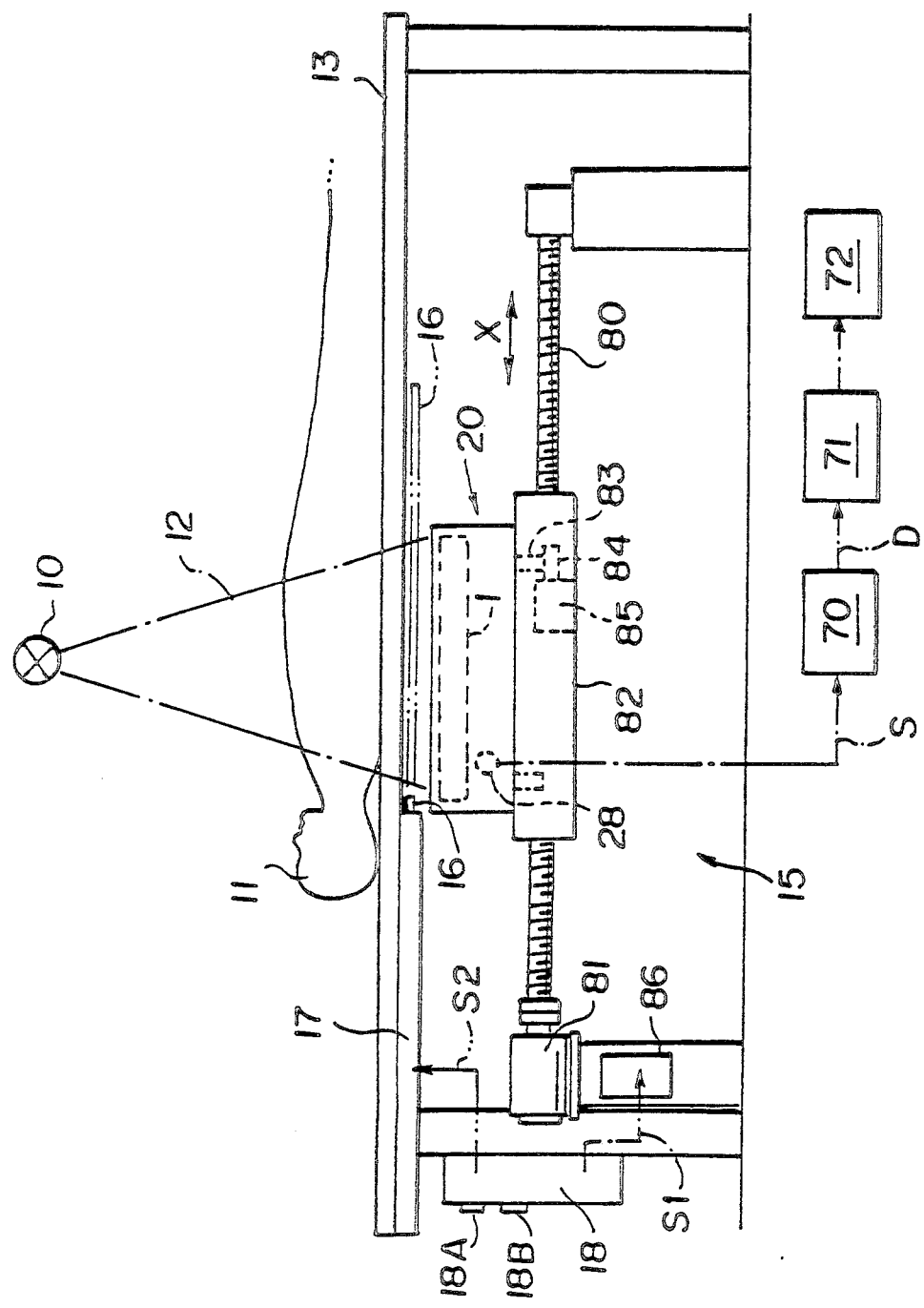
FIG. 1 is a schematic side view showing an embodiment of the first radiation image recording and read-out apparatus in accordance with the present invention.

With reference to FIG. 1, an embodiment of the first radiation image recording and read-out apparatus in accordance with the present invention is provided with an object support 13 for supporting an object 11 from below, a recording and read-out unit 20 provided at a position exposed to radiation 12 such as X-rays produced by a radiation source 10 constituted by an X-ray tube or the like and passing through the object 11, and a unit movement means 15 for moving the recording and read-out unit 20 two-dimensionally (i.e. in the direction as indicated by the arrow X and in the direction normal thereto) in a horizontal plane along the object support 13. The embodiment also provided with a shutter 16 formed of lead having a high radiation absorptivity and positioned between the recording and read-out unit 20 and the object support 13, a shutter operation means 17 for moving the shutter 16 in the direction as indicated by the arrow X, and a subdivision image recording controller 18. The unit movement means 15 is constituted by a plurality of screw rods 80, 80, . . . extending in the direction as indicated by the arrow X, a motor 81 for rotating each of the screw rods 80, 80, . . . , a table 82 having female threads engaging with the screw rods 80, 80, . . . and moved in the direction as indicated by the arrow X by the rotation of the screw rods 80, 80, . . . , a rack 83 secured to the recording and read-out unit 20 and held on the table 82 movably in the direction normal to the direction as indicated by the arrow X, i.e. for movement at the angle normal to the drawing sheet in FIG. 1, a pinion 84 engaged to move the rack 83, a motor 85 for rotating the pinion 84 to move the rack 83 (an consequently, the recording and read-out unit 20) in the aforesaid direction, and a control section 86 for controlling the operations of the motors 81 and 85.

First, the recording and read-out unit 20 will be described below with reference to FIGS. 2 and 3. An endless recording belt 1 provided with a stimulable phosphor layer approximately over the overally outer surface and thus formed as a stimulable phosphor sheet is applied around a first roller section 43 composed of rollers 41 and 42, and a second roller section 46 composed of rollers 44 and 45 spaced by a predetermined distance from the first roller section 43. The rollers 41, 42 and 44 are the driven rollers rotated as the recording belt 1 is moved, and the roller 45 is a drive roller coupled with a rotation shaft 48a of a motor 48 by a power transmission means 47 constituted by a belt, a chain or the like. As the drive roller 45 is rotated, the recording belt 1 is rotated and moved in the direction as indicated by the arrow in FIG. 2.

In the course of ordinary radiation image recording, the shutter 16 is maintained at a retracted position upon which the radiation 12 produced by the radiation source 10 does not impinge, i.e. at the position (the position as indicated by the solid line in FIG. 1) that allows the radiation 12 to impinge upon approximately the overall surface of the upper side part of the recording belt 1. In this condition, the object 11 is placed on the object support 13 and the radiation source 10 is activated. As a result, the radiation 12 passing through the object 11 impinges upon the recording belt 1, and a radiation image of the object 11 is stored on the stimulable phosphor layer of the recording belt 1. The distance between the roller sections 43 and 46 is nearly equal to the length of the single image recorded in this manner. Therefore, with a single recording step, the radiation image is stored over the overall area of the upper side part of the recording belt 1 in FIG. 2. Thus, in this embodiment, an image recording section 4 is formed between the upper rollers 41 and 44.

The recording belt 1 is maintained stationary as long as the image recording is being carried out. When the image recording is finished, a drive signal is fed from a controller (not shown) to a control circuit 3 in the recording and read-out unit 20, the motor 48 is thereby operated to rotate the drive roller 45, and the recording belt 1 is moved. In this manner, the image-recorded portion of the recording belt 1 is conveyed to an image read-out section 30 provided below the recording belt 1. A rotary encoder 39 is provided on a rotation shaft 48a of the motor 48, and the motor 48 is stopped at the time the rotary encoder 39 detects that the recording belt 1 has rotated one-half turn.

Figure 2:
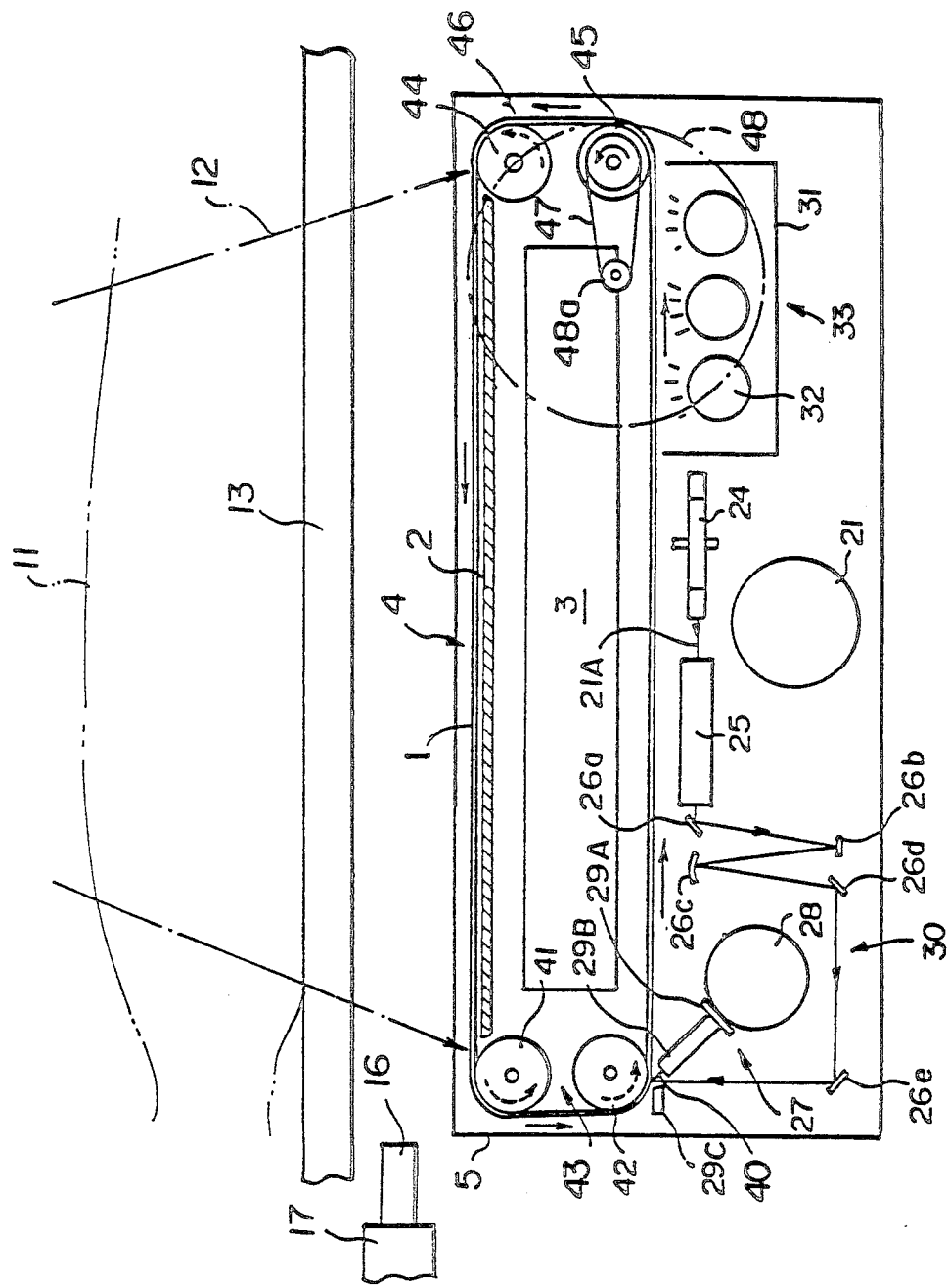
FIGS. 2 and 3 are a side view and a plan view showing the recording and read-out unit in the embodiment shown in FIG. 1, FIGS. 4 and 5 are a partially cutaway perspective view and a sectional side view showing the photomultiplier employed in the recording and read-out unit shown in FIG. 2.
Figure 3:
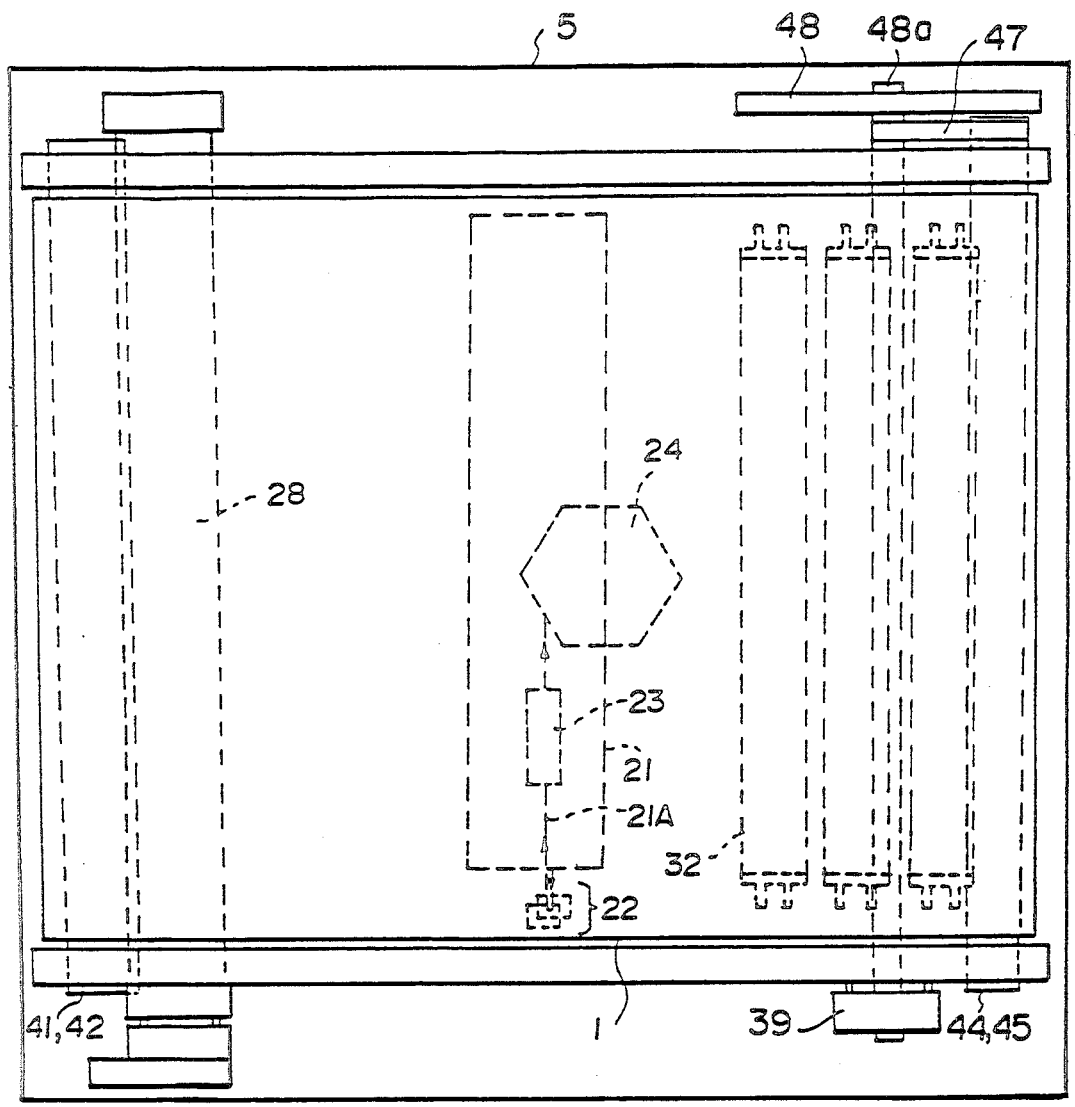

At the image read-out section 30, a stimulating ray source 21 constituted by a He—Ne laser or the like for producing stimulating rays 21A extends in the width direction of the recording belt 1, i.e. in the vertical direction in FIG. 3. Also, a rotating polygon mirror 24 is provided as a light deflector for scanning the stimulating rays 21A on the recording belt 1 in the width direction of the recording belt 1, i.e. in the main scanning direction. As shown in FIG. 3, the optical path of the stimulating rays 21A produced by the stimulating ray source 21 is changed by a mirror group 22, and then the stimulating rays 21A pass through a light input optical system 23 provided with a beam expander, a cylindrical lens or the like, and impinge upon the rotating polygon mirror 24. As shown in FIG. 2, the stimulating rays 21A reflected and deflected by the rotating polygon mirror 24 pass through a scanning optical system 25 composed of an fθ lens or the like, the optical path of the stimulating rays 21A is changed by mirrors 26a, 26b, 26c, 26d and 26e, and then the stimulating rays 21A impinge upon the recording belt 1 on the lower circumferential surface of the roller 42 and scans the recording belt 1 in the main scanning direction as mentioned above. The mirror 26c is a cylindrical mirror for converging the stimulating rays 21A only in a plane parallel to the drawing sheet in FIG. 2. In the aforesaid optical system, the mirror 26c and the cylindrical lens in the aforesaid light input optical system 23 prevent pitch nonuniformity of scanning lines from arising on the recording belt 1 even though axis deviation, mirror surface inclination or the like arises with the rotating polygon mirror 24. Simultaneously with the main scanning by the stimulating rays 21A, the recording belt 1 is moved by the drive roller 45 at a predetermined speed. Sub-scanning with the stimulating rays 21A is carried out in this manner, and the stimulating rays 21A are irradiated to nearly the overall surface of the image-recorded portion of recording belt 1.

As the recording belt 1 is exposed to the stimulating rays 21A, the exposed part of the recording belt 1 emits light 40 in an amount proportional to the stored radiation energy, and the emitted light 40 is detected by a photoelectric read-out means 27. In this embodiment, the photoelectric read-out means 27 comprises a long photomultiplier 28 having a light receiving face extending in the main scanning direction at least over the length of the main scanning line, a filter 29A closely contacted with the light receiving face of the photomultiplier 28 for selectively transmitting only the light 40 emitted by the recording belt 1 and preventing entry of the stimulating rays 21A reflected by the surface of the recording belt 1 to the photomultiplier 28, and a light guide member 29B provided on the filter 29A for guiding the light 40 emitted by the recording belt 1 to the photomultiplier 28. Also, a mirror 29C is disposed to face the photoelectric read-out means 27 via the scanning line for efficiently reflecting the light 40, which is emitted by the recording belt 1 toward the mirror 29C, to the light input face of the light guide member 29B.

By way of example, as shown in FIGS. 4 and 5, the photomultiplier 28 has an electrode configuration generally called the venetian blind type. The photomultiplier 28 comprises a cylindrical body 28A, a photocathode 28b disposed along the inner surface of the body 28A to face a light receiving face 28a, and a multiplying section 28f disposed under the photocathode 28b and including a plurality (13 pieces in this embodiment) of plate-like dynodes 28c which are stacked via insulating members 28d, 28d secured by pins 28e, 28e. The dynodes 28c are respectively constituted by a conductive plate provided with a plurality of sections cut in a U-shape and bent to form a blind-like shape. A shield electrode 28g is secured by the pins 28e, 28e under the multiplying section 28f via the insulating members 28d, 28d, and an anode 28h is disposed inside of the shield electrode 28g. These electrodes are connected in one-to-one relation with terminals of a terminal group 28i disposed at the side end of the body 28A. The shield electrode 28g need not necessarily be provided.

Figure 6:
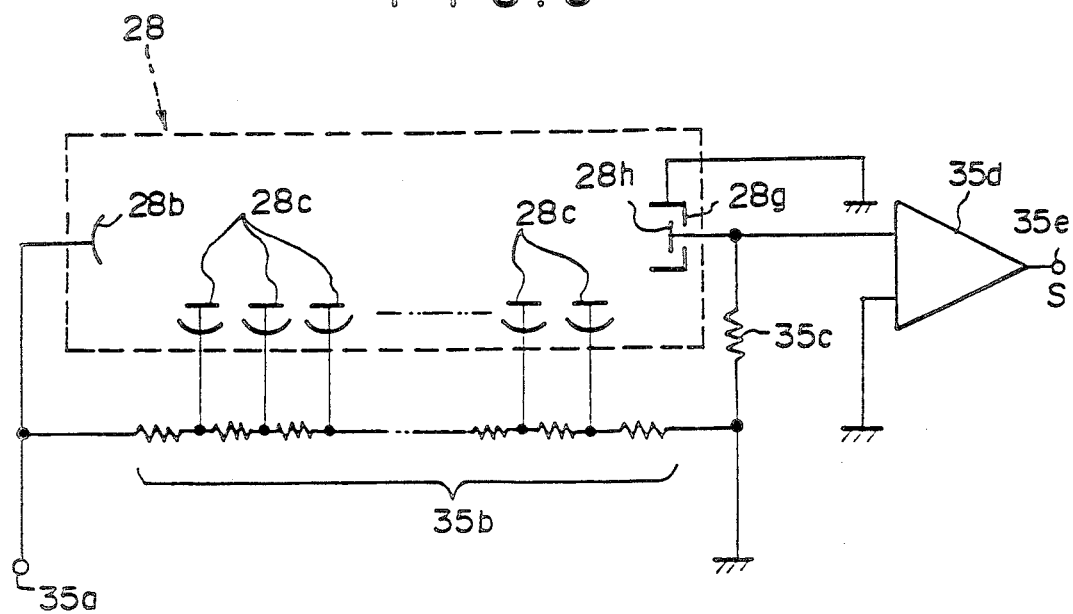
FIG. 6 is a circuit diagram showing the electric circuit for the photomultiplier shown in FIG. 4.

FIG. 6 shows an electric circuit for operating the photomultiplier 28 and obtaining a photoelectric output. In FIG. 6, similar elements are numbered with the same reference numerals with respect to FIGS. 4 and 5. The operations of the photomultiplier 28 will hereinbelow be described with reference to FIG. 6. A high negative voltage is applied to the photocathode 28b via a high negative voltage applying terminal 35a. The high negative voltage applied to the high negative voltage applying terminal 35a is divided by a bleeder resistance group 35b into voltages which are applied respectively to the dynodes 28c. The shield electrode 28g is grounded, and the anode 28h is connected with the bleeder resistance group 35b via a resistor 36c and with an amplifier 35d. Photoelectrons released from the photocathode 28b upon exposure to the light 40 emitted by the stimulable phosphor sheet 22 impinge upon the dynodes 28c in the course of advancement toward the anode 28h, and secondary electrons are thus released from the dynodes 28c. In this manner, the photoelectrons are sequentially amplified by the dynodes 28c, and the current thus obtained is fed to the amplifier 35d. The photoelectrically converted image information is thus obtained as analog electric signals (read-out image signals) S from an output terminal 35e of the amplifier 35d.

The portion of the recording belt 1 on which the image read-out has been finished is sent by the drive roller 45 to an erasing section 33. The erasing section 33 comprises a case 31, and a plurality of (by way of example, three) erasing light sources 32, 32, . . . constituted by fluorescent lamps or the like and disposed in the case 31. The erasing light sources 32, 32, . . . mainly produce erasing light having a wavelength within the stimulation wavelength range of the stimulable phosphor layer of the recording belt 1. The erasing light is irradiated to the overall image forming region of the recording belt 1 while the recording belt 1 is being conveyed, thereby to release radiation energy remaining on the stimulable phosphor layer of the recording belt 1 after the image read-out is finished. The recording belt portion on which the erasing has been finished at the erasing section 33 is conveyed to the image recording position for reuse in image recording.

As the erasing light sources 32, 32, . . . , tungsten-filament lamps, halogen lamps, infrared lamps, xenon flash lamps or the like as disclosed in U.S. Pat. No. 4,400,619 may be selected as well as the aforesaid fluorescent lamps. The erasing section 33 may also be composed of a surface type erasing light source such as a panel comprising light emitting diodes arrayed two-dimensionally or an EL (electroluminescence) plate, as well as a plurality of the erasing light sources 32, 32, . . . as mentioned above. Also, a lead plate 2 for shielding the radiation is provided in the recording and read-out unit 20, and therefore the radiation 12 produced by the radiation source 11 at the time of the image recording is prevented from impinging upon the recording belt 1 at the image read-out section 30 or the erasing section 33, or adversely affecting the image read-out section 30 or the erasing section 33.

As shown in FIG. 1, the output signals (read-out image signals) S generated by the amplifier (logarithmic amplifier) 35d are fed out of the recording and read-out unit 20, and digitized by an A/D converter 70. The digital read-out image signals D obtained in this manner and representing the radiation image of the object 11 are passed through an image processing apparatus 71 for carrying out gradation processing, frequency response processing or the like, and sent to an image reproducing apparatus 72. By way of example, the image reproducing apparatus 72 is constituted by a CRT, a light beam scanning recording apparatus or the like, and displays the image which the image signals D represent, i.e. the radiation image of the object 11 which was stored on the recording belt 1 or reproduces it as a hard copy.

Figure 7:
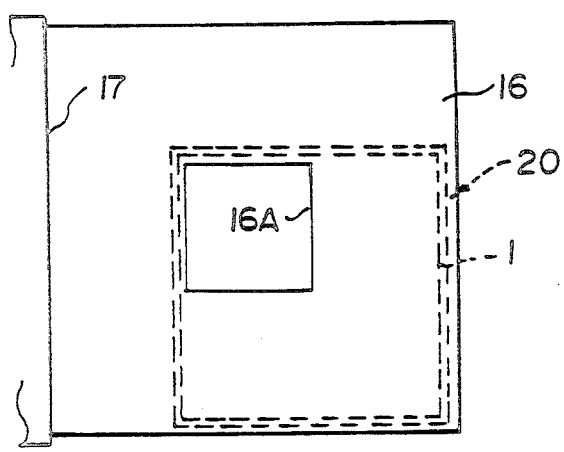
FIG. 7 is a plan view showing the conditions of the shutter and the recording and read-out unit in the embodiment shown in FIG. 1 in the course of subdivision image recording.

The subdivision image recording will be described hereinbelow. When an operation pushbutton 18A of the subdivision image recording controller 18 is depressed to instruct the subdivision image recording, operation control signals S1 and S2 are sent from the subdivision image recording controller 18 to the unit movement means 15 and the shutter operation means 17. Upon receiving the operation control signal S2, the shutter operation means 17 projects the shutter 16 rightward in FIG. 1 to the masking position (the position as indicated by the chain line in FIG. 1) at which the middle of the shutter 16 exactly faces the radiation source 10. As shown in FIG. 7, the shutter 16 has a square opening 16A at the middle, and the size of the opening 16A is adjusted to be approximately a quarter of the upper side area of the recording belt 1 applied around the roller sections 43 and 46 in the recording and read-out unit 20. On the other hand, the control section 86 of the unit movement means 15 receives the operation control signal S1, and operates the motors 81 and 85 to move the recording and read-out unit 20 to such a position (the position as shown in FIG. 7) that the approximately quarter region of the upper side part of the recording belt 1 faces the opening 16A. In this condition, the radiation source 10 is activated, only the radiation 12 passing through the opening 16A of the shutter 16 impinges upon the recording belt 1, and a radiation image of the object 11 is stored on the quarter region 1A of the upper side part of the recording belt 1 as shown in FIG. 8.

Figure 8:
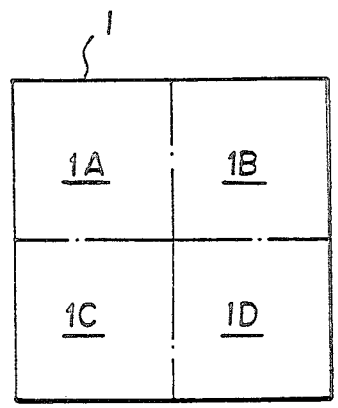
FIG. 8 is an explanatory view showing the subdivision image recording regions on the stimulable phosphor sheet in the embodiment shown in FIG. 1, FIGS. 9A and 9B are elevational views showing another example of the recording and read-out unit employed in the first radiation image recording and read-out apparatus in accordance with the present invention.

By way of example, when another operation pushbutton 18B of the subdivision image recording controller 18 is depressed, the unit movement means 15 moves the recording and read-out unit 20 leftward in FIG. 7 until another quarter region 1B of the recording belt 1 as shown in FIG. 8 faces the opening 16A. In this condition, the radiation source 10 is activated, and a radiation image of the object 11 is stored on the quarter region 1B in the same manner as mentioned above.

Thereafter, the movement of the recording and read-out unit 20 and the operation of the radiation source 10 are repeated in the same manner as mentioned above, and the subdivision image recording can thus be carried out at quarter regions 1C and 1D of the upper side part of the recording belt 1 as shown in FIG. 8. Instead of using all of the quarter regions 1A to 1D, the image recording may be carried out by use of three or less of the quarter regions 1A to 1D. Also, instead of manually operating the operation pushbutton 18B, detection signals for the operation of the radiation source 10 may be fed to the subdivision image recording controller 18, so that the recording and read-out unit 20 is automatically moved each time a single image recording step is finished.

When a signal representing the completion of the aforesaid subdivision image recording is fed to the subdivision image recording controller 18, by way of example, manually, the unit movement means 15 and the shutter operation means 17 are operated under the control by the subdivision image recording controller 18, so that recording and read-out unit 20 is returned to the position at which the middle of the recording and read-out unit 20 exactly faces the radiation source 10, and the shutter 16 is returned to the aforesaid retracted position. Also, the portion of the recording belt 1 at which the subdivision image recording has been carried out is sent to the image read-out section 30 in the same manner as in the aforesaid ordinary image recording, and the radiation images recorded by the subdivision image recording are read out from the recording belt 1. The radiation images thus read out are displayed or reproduced into visible images in the same format as the subdivision image recording format on the image reproducing apparatus 72 shown in FIG. 1.

Instead of constituting the embodiment to carry out the four-on-one subdivision image recording as mentioned above, the first radiation image recording and read-out apparatus in accordance with the present invention may also be constituted for carrying out two-on-one subdivision image recording, three-on-one subdivision image recording or the subdivision image recording in different formats. For example, in the case where the two-on-one subdivision image recording is to be carried out, the shutter 16 need not be provided with the opening 16A and may be formed moveably between the masking position at which the shutter 16 covers approximately one-half part of the upper side region of the recording belt 1 and the position retracted completely from the upper side region of the recording belt 1.

With the recording and read-out unit 20, the recording belt 1 is applied between the roller sections 43 and 46 spaced from each other by a distance approximately equal to the length of a single radiation image area (i.e. the single image area in the ordinary image recording), the image recording is carried out from above the recording belt 1, and the image read-out is carried out from below the recording belt 1. Therefore, all of the mechanisms of the recording and read-out unit 20 are housed in the small case 5 having the longitudinal and transverse dimensions slightly larger than the recording area for a single image (i.e. the single image in the ordinary image recording). With the recording and read-out unit 20 having such a configuration, the radiation image recording and read-out apparatus as a whole can be made small and light. A grid for absorbing the radiation scattered by the object 11, or a bucky device provided with the grid and a means for reciprocal movement of the grid may be provided above the recording belt 1 in the recording and read-out unit 20.

In the aforesaid embodiment, the recording and read-out unit 20 is formed in the small case 5 slightly larger than the recording area for a single image. As such a small recording and read-out unit, different configurations may also be employed. Different examples of the small recording and read-out unit employed in accordance with the present invention will be described hereinbelow.

Figure 9A:
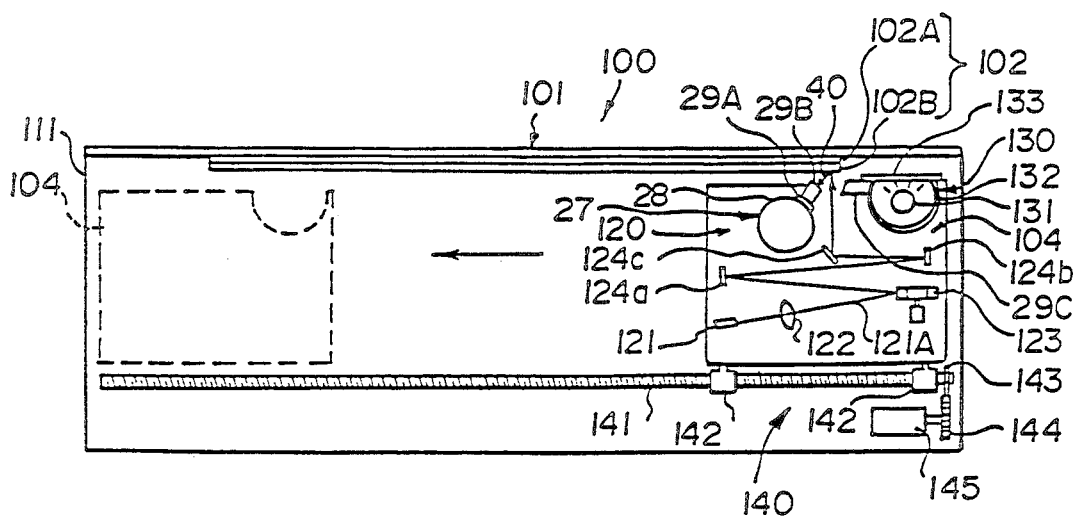
Figure 9B:
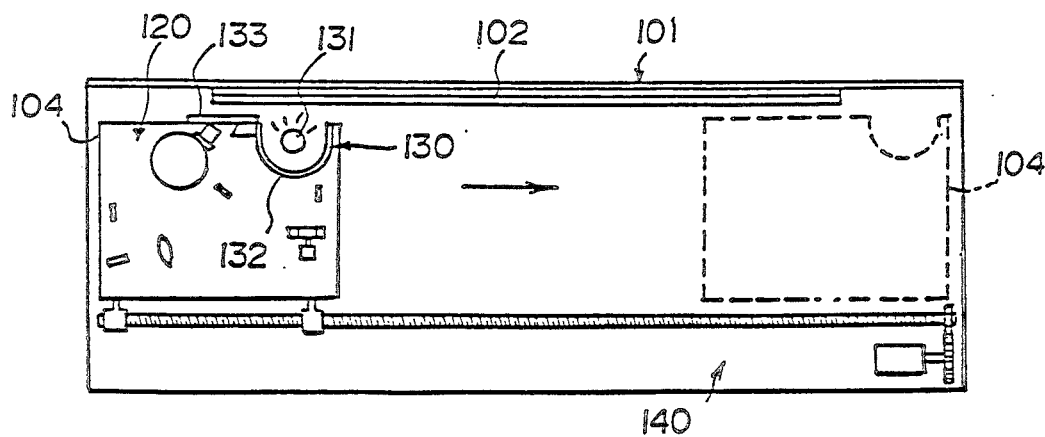

With reference to FIG. 9A and 9B, a stimulable phosphor sheet 102 is secured horizontally at an image recording section 101 provided at the upper part of a case 111 of a recording and read-out unit 100. The case 111 has a size slightly larger than the size of the stimulable phosphor sheet 102. The stimulable phosphor sheet 102 is composed of a radiation-permeable substrate 102A and a stimulable phosphor layer 102B overlaid on the substrate 102B.

A read-out and erasing section 104 comprising a box 103, and an image read-out section 120 and an erasing section 130 integrally housed close to each other in the box 103 is provided below the stimulable phosphor sheet 102. The read-out and erasing section 104 is reciprocally moveable while facing the stimulable phosphor sheet 102 between the right end position (first position) as indicated by the solid line in FIG. 9A and the left end position (second position) as indicated by the solid line in FIG. 9B. In this embodiment, movement from the first position to the second position is referred to as forward movement, and movement from the second position to the first position is referred to as backward movement. Also, by way of example, a movement means 140 for reciprocally moving the read-out and erasing section 104 is composed of a screw rod 141 extending in the direction of movement of the read-out and erasing section 104, supporting members 142, 142 engaged with the screw rod 141, a gear 143 secured to the screw rod 141, a gear 144 meshing with the gear 143, and a motor 145 for rotating the gear 144 in the normal and reverse directions. The screw rod 141 is rotated by the motor 145 via the gears 143 and 144, thereby to move the supporting members 142, 142 forward and backward and carry out reciprocal movement of the read-out and erasing section 104.

In the case where the recording and read-out unit 100 is employed, the stimulable phosphor sheet 102 is exposed to the radiation produced by the radiation source and passing through the object in the same manner as in the aforesaid embodiment, thereby to store the radiation image on the stimulable phosphor layer 102B of the stimulable phosphor sheet 102. Also, the subdivision image recording is carried out in the same manner as in the aforesaid embodiment.

The image read-out section 120 is provided with a stimulating ray scanning means which comprises a stimulating ray source 121 constituted by a semiconductor laser or the like, a condensing lens 122 disposed in the optical path of stimulating rays 121A produced by the stimulating ray source 121, a rotating polygon mirror 123 as a light deflector for deflecting the stimulating rays 121A passing through the condensing lens 122 at an angle normal to the drawing sheet in FIG. 9A, thereby to scan the stimulating rays 121A in a main scanning direction on the stimulable phosphor sheet 102, and mirrors 124a, 124b and 124c for changing the optical path of the stimulating rays 121A. The stimulating rays 121A is made by the stimulating ray scanning means to repeatedly scan the stimulable phosphor sheet 102 in the main scanning direction. On the other hand, simultaneously with the scanning of the stimulating rays 121A in the main scanning direction, the read-out and erasing section 104 is conveyed by the movement means 140 at a predetermined speed leftward in FIG. 9A. As a result, the sub-scanning by the stimulating rays 121A is carried out, and almost the overall surface of the stimulable phosphor sheet 102 is exposed to the stimulating rays 121A. As the stimulable phosphor sheet 102 is exposed to the stimulating rays 121A, the exposed portion of the sheet 102 emits the light 40 in proportion to the stored radiation energy, and the emitted light 40 is detected by a photoelectric read-out means 27 of the image read-out section 120.

In this embodiment, the photoelectric read-out means 27 is formed in the same manner as in the recording and read-out unit 20 shown in FIGS. 2 and 3 and comprises the long photomultiplier 28, the filter 29A, the light guide member 29B, and the mirror 29C for reflecting the light 40 emitted by the stimulable phosphor sheet 102 toward the light receiving face of the light guide member 29B. When the image read-out by the photoelectric read-out means 27 has been finished, as shown in FIG. 9B, the read-out and erasing section 104 is conveyed rightward from its second position to its first position. An erasing means 130 is provided with an erasing light source 131 constituted by a fluorescent lamp or the like and extending in the main scanning direction, and a reflection plate 132 for reflecting the erasing light, that is radiated downward by the erasing light source 131, toward the surface of the stimulable phosphor sheet 102. Also, in this embodiment, the erasing light source 131 is normally turned on. Therefore, a moveable shutter 133 is provided so that it is disposed above the erasing light source 131 as shown in FIG. 9A to shield the erasing light at the time the image recording and the image read-out are carried out, and is retracted to the position above the photomultiplier 28 as shown in FIG. 9B to lay bare the erasing light source 131 only when the erasing is to be carried out. The moveable shutter 133 need not necessarily be provided in the case where the erasing light source 131 is turned on only when the erasing is to be carried out, and is turned off in the steps other than the erasing. As the read-out and erasing section 104 is moved in the manner as mentioned above, the erasing light source 131 irradiates the erasing light to the overall surface of the stimulable phosphor sheet 102. The erasing light source 131 mainly produces light having a wavelength within the stimulation wavelength range of the stimulable phosphor sheet 102, and radiation energy remaining on the sheet 102 after the image read-out therefrom has been carried out is released from the sheet 102 when the sheet 102 is exposed to the erasing light. The stimulable phosphor sheet 102 thus erased can be reused for image recording, and the read-out and erasing section 104 is returned to its first position.

With the recording and read-out unit 100 wherein a single stimulable phosphor sheet 102 is secured and held, and the image read-out and erasing are carried out by reciprocally moving the read-out and erasing section 104, the length of the recording and read-out unit 100 can be decreased nearly to the length of a single stimulable phosphor sheet 102.

In the recording and read-out unit 100, the stimulating rays 121A are scanned and the light 40 emitted by the stimulable phosphor sheet 102 is detected by the photomultiplier 28. However, as proposed in, for example, Japanese Patent Application No. 62(1987)-21957, which corresponds to U.S. application Ser. No. 145,180, now U.S. Pat. No. 4,883,961 it is also possible to linearly irradiate the stimulating rays to the stimulable phosphor sheet 102, and to detect the emitted light 40 by a line sensor. This also applies to the recording and read-out unit 20 shown in FIGS. 2 and 3, and the recording and read-out units as will be described later.

A further example of the recording and read-out unit employed in accordance with the present invention will hereinbelow be described with reference to FIG. 10. In a case 229 of a recording and read-out unit 200 shown in FIG. 10, a first wind-up shaft 222 and a second wind-up shaft 223 are provided in spaced and parallel relation to each other. The distance between the first wind-up shaft 222 and the second wind-up shaft 223 is adjusted to be slightly longer than the length of a single image area of the image recorded on a stimulable phosphor sheet 226 as will be described later. The first wind-up shaft 222 and the second wind-up shaft 223 are respectively rotated by motors 224 and 225 as the sheet feed means counter-clockwise and clockwise in FIG. 10. One end side of the stimulable phosphor sheet 226 capable of storing the radiation image thereon is wound around the first wind-up shaft 222. The stimulable phosphor sheet 226 is formed in the long strip-like shape by use of a flexible substrate. The other end side of the stimulable phosphor sheet 226 is supported by the second wind-up shaft 223 so that the sheet 226 can be wound up therearound. Also, the stimulable phosphor sheet 226 is applied between a roller 227 and rollers 228, 228 disposed between the first wind-up shaft 222 and the second wind-up shaft 223. The stimulable phosphor sheet 226 is positioned so that the flexible substrate substantially permeable to the radiation irradiated from above faces up and the stimulable phosphor layer overlaid on the substrate faces down. With the recording and read-out unit 200, the recording of the radiation image of the object, including the subdivision image recording, is carried out in the same manner as with the aforesaid recording and read-out units 20 and 100. Specifically, in the recording the read-out unit 200, an image recording section 280 is formed between the roller 227 and the rollers 228, 228.

An image read-out section 250 is provided below the stimulable phosphor sheet 226 in the vicinity of the second wind-up shaft 223. The image read-out section 250 is constituted by a stimulating ray source 251 which may be a semiconductor laser, a rotating polygon mirror 253 as a light deflector for reflecting and deflecting stimulating rays 252 produced by the stimulating ray source 251, a long mirror 259 for reflecting the deflected stimulating rays 252 so that the stimulating rays 252 one-dimensionally scans the stimulable phosphor sheet 226, specifically the stimulable phosphor layer thereof, the drive rollers 228, 228 composed of a pair of nip rollers for grasping the stimulable phosphor sheet 226 therebetween and acting as a sub-scanning means rotated at a predetermined speed, a long photomultiplier 254 disposed so that the light receiving face thereof extends along the scanning line (main scanning line) of the stimulating rays 252 on the stimulable phosphor sheet 226, and a long light guiding reflection mirror 255 extending along the long photomuliplier 254. In this embodiment, the photomultiplier 254 has the electrode configuration referred to as the box type. However, the photomultiplier of the type as shown in FIGS. 4 and 5 may also be employed. After a radiation image of the object is stored on the stimulable phosphor sheet 226 in the manner as mentioned above, the drive rollers 228, 228 are rotated to convey the stimulable phosphor sheet 226 at a predetermined speed rightward in FIG. 10. At this time, the second wind-up shaft 223 is rotated to wind up the stimulable phosphor sheet 226 therearound. An appropriate load has been given to the first wind-up shaft 222 by a known means (not shown) to maintain the stimulable phosphor sheet 226 in the tensioned condition. As the stimulable phosphor sheet 226 is thus conveyed, the stimulating ray source 251 and the rotating polygon mirror 253 are operated so that the stimulating rays 252 scan the stimulable phosphor sheet 226. The portion of the stimulable phosphor sheet 226 exposed to the stimulating rays 252 emits the light 40 carrying the radiation image stored on the stimulable phosphor sheet 226. The emitted light 40 is efficiently detected by the photomultiplier 254 directly or after being reflected by the light guiding reflection mirror 255. Simultaneously with the main scanning of the stimulating rays 252, the stimulable phosphor sheet 226 is conveyed in the sub-scanning direction, and consequently the detection of the light 40 emitted by the stimulable phosphor sheet 226 is carried out two-dimensionally.

The portion of the stimulable phosphor sheet 226 for which the image read-out has been finished in the manner as mentioned above is wound up around the second wind-up shaft 223. Also, a subsequent portion of the stimulable phosphor sheet 226 that has been wound around the first wind-up shaft 222 is fed to the position between the roller 227 and the drive rollers 228, 228, and it becomes possible to record a radiation image on said portion of the sheet 226 in the same manner as mentioned above. After the radiation image recording has thus been carried out over approximately the overall length of the stimulable phosphor sheet 226 and the sheet 226 that has been wound around the first wind-up shaft 222 has been delivered toward the second wind-up shaft 223, the motor 224 is operated to rotate the first wind-up shaft 222 counter-clockwise. Thus the stimulable phosphor sheet 226 on which the image read-out has been finished and which has been wound around the second wind-up shaft 223 is returned to the first wind-up shaft 222. At this time, the stimulable phosphor sheet 226 passes over an erasing section 260 provided between the roller 227 and the drive rollers 228, 228, and is subjected to image (residual image) erasing. By way of example, the erasing section 260 is constituted by a plurality of erasing light sources 261, 261, ... positioned below the stimulable phosphor sheet 226. The erasing light sources 261, 261, ... are constituted by fluorescent lamps or the like, and produce erasing light having a wavelength within the stimulation wavelength range for the stimulable phosphor of the stimulable phosphor sheet 226. The erasing light sources 261, 261, ... are turned on at the time the stimulable phosphor sheet 226 is returned to the first wind-up shaft 222. Upon exposure to the erasing light, the radiation energy remaining on the stimulable phosphor sheet 226 after the image read-out therefrom has been finished is released from the sheet 226. The erasing light is shielded by light shielding plates 262 and 263 so that it does not impinge upon the long photomultiplier 254 at the image read-out section 250. The light shielding plates 262 and 263 need not be provided in the case where the long photomultiplier 254 is turned off after the image read-out is finished.

In this manner, the stimulable phosphor sheet 226 on which the image (residual image) erasing has been effected to such an extent that the sheet 226 can be reused for the radiation image recording is stored around the first wind-up shaft 222. Therefore, the radiation image recording and the read-out can be repeated by use of the erased reusable stimulable phosphor sheet 226.

Figure 10:
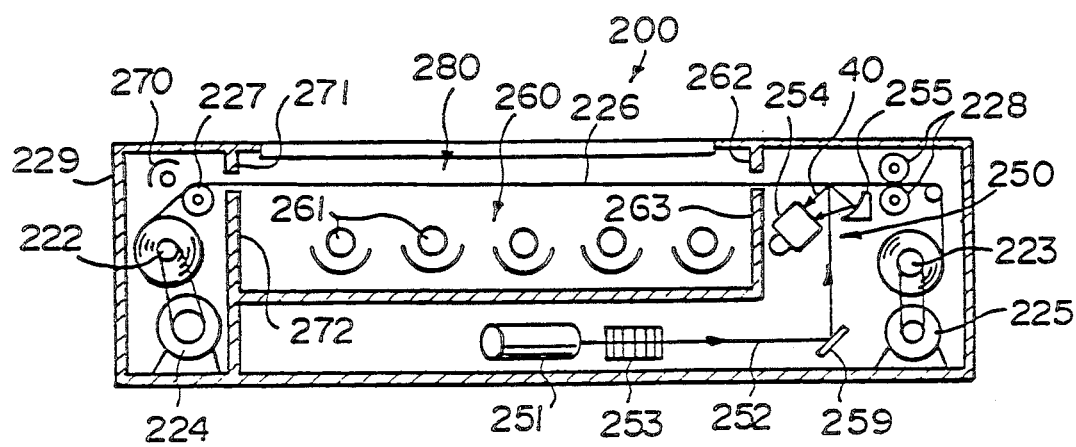
FIG. 10 is an elevational view showing a further example of the recording and read-out unit employed in the first radiation image recording and read-out apparatus in accordance with the present invention.

In the embodiment shown in FIG. 10, a secondary erasing light source 270 for carrying out secondary erasing is provided between the first wind-up shaft 222 and the image recording section 280. The secondary erasing light source 270 is composed of a light source of the same type as the erasing light sources 261, 261, . . . at the erasing section 260, and is turned on to irradiate the erasing light to the stimulable phosphor sheet 226 at the time the sheet 226 is delivered from the first wind-up shaft 222 for carrying out the radiation image recording. In the case where the stimulable phosphor sheet 226 has been stored around first wind-up shaft 222 without being used for a long period after being subjected to the image (residual image) erasing at the erasing section 260, the stimulable phosphor sheet 226 stores energy of radiations emitted by radioactive isotopes such as Ra226, which are contained as impurities in the stimulable phosphor, or energy of environmental radiations. These types of radiation energy undesirably stored on the stimulable phosphor sheet 226 cause noise in a radiation image recorded next on the stimulable phosphor sheet 226. Exactly prior to the image recording, such radiation energy is erased by exposing the stimulable phosphor sheet 226 to the secondary erasing light produced by the secondary erasing light source 270. The secondary erasing light is intercepted by light shielding plates 271 and 272 so that the sheet 226 prior to the image read-out is not exposed thereto.

In the embodiment shown in FIG. 10, the image recording and the image read-out are carried out alternately at the time the stimulable phosphor sheet 226 is wound up from the first wind-up shaft 222 to the second wind-up shaft 223. Instead, the image recording may first be carried out, and then the image read-out and the erasing may be carried out in the course of rewinding the stimulable phosphor sheet 226 from the second wind-up shaft 223 to the first wind-up shaft 222.

Figure 11:
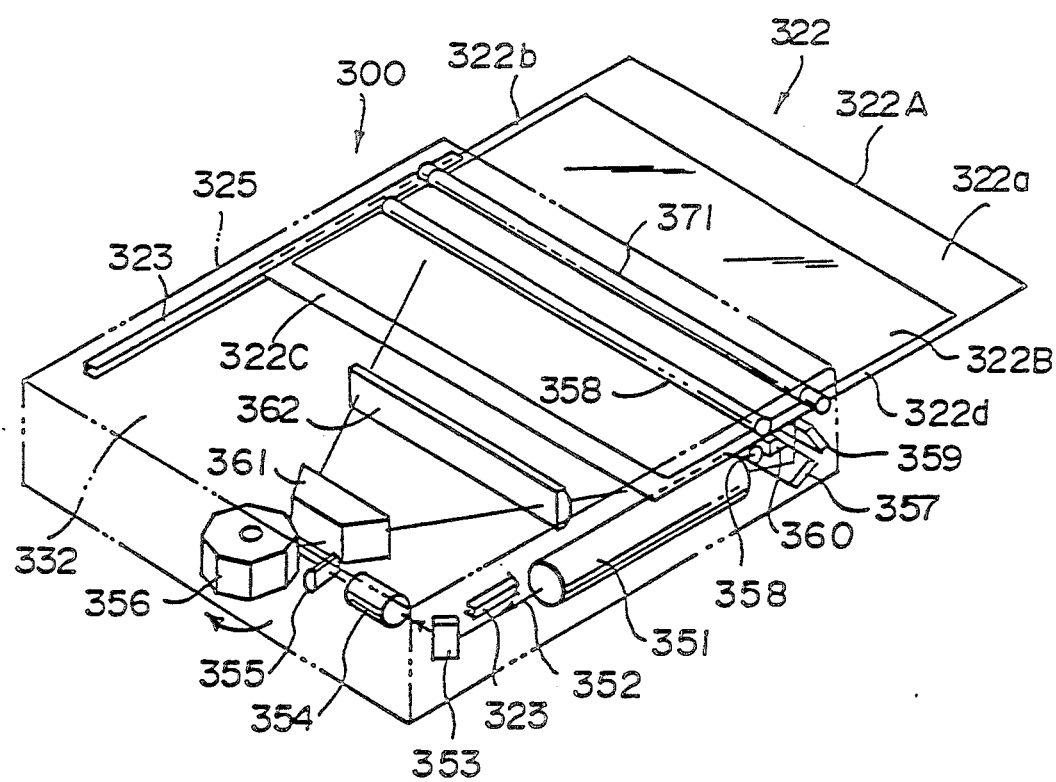
FIG. 11 is a schematic perspective view showing a still further example of the recording and read-out unit employed in the first radiation image recording and read-out apparatus in accordance with the present invention.
Figure 12:
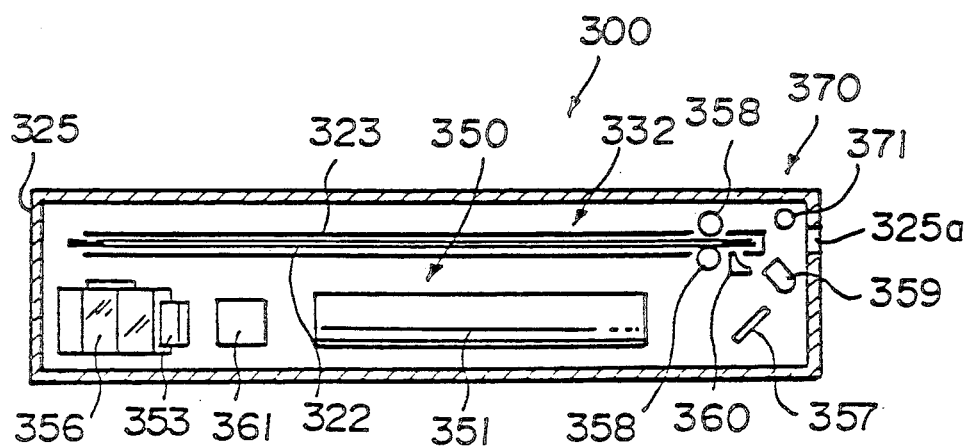
FIGS. 12 and 13 are partially cutaway elevational views showing the conditions of the recording and read-out unit shown in FIG. 11 in the course of image recording and in the course of image read-out.

A still further example of the recording and read-out unit employed in the radiation image recording and read-out apparatus in accordance with the present invention will hereinbelow be described with reference to FIGS. 11, 12 and 13. In a case 325 of a recording and read-out unit 300, a stimulable phosphor sheet 322 composed of, by way of example, a transparent plate-like substrate 322A and a stimulable phosphor layer 322B overlaid thereon is provided. The substrate 322A of the stimulable phosphor sheet 322 is formed to be larger than the stimulable phosphor layer 322B, and the portions of the substrate 322A around the stimulable phosphor layer 322B constitute holding portions 322a, 322b, 322c and 322d. In this embodiment, the stimulable phosphor sheet 322 is disposed so that the stimulable phosphor layer 322B comes under the substrate 322A, and is supported in the case 325 with the holding portions 322b and 322d being slideably supported on rails 323, 323. Specifically, the upper part of the case 325 including the rails 323, 323 is constituted as an image recording section 332 for holding the stimulable phosphor sheet 322 in the course of the radiation image recording.

The longitudinal and transverse dimensions of the case 325 are adjusted to be slightly larger than those of the stimulable phosphor sheet 322. Also, as shown in FIG. 12, an end of the case 325 is provided with the elongated opening 325a which faces the edge face of the stimulable phosphor sheet 322. The regions of the case 325 outside of the region facing the image recording section 332 are lined with a radiation absorbing material such as a lead plate so that no fog is caused to arise on the stimulable phosphor sheet 322 by environmental radiations or the like other than the radiation used for the image recording.

With the recording and read-out unit 300, the recording of the radiation image of the object, including the subdivision image recording, is carried out in the same manner as with the aforesaid recording and read-out units 20, 100 and 200, and the radiation image of the object is stored on the stimulable phosphor sheet 322, specifically on the stimulable phosphor layer 322B formed on the lower surface side of the sheet 322.

An image read-out section 350 is provided below the stimulable phosphor sheet 322 in the case 325. The image read-out section 350 is provided with a stimulating ray source 351 constituted by a laser or the like, a mirror 353 for reflecting the stimulating rays 352 produced by the stimulating ray source 351, a beam expander 354 for adjusting the beam diameter of the stimulating rays 352 to a predetermined value, a cylindrical lens 355 for making the stimulating rays 352 impinge upon the mirror surface of a rotating polygon mirror 356 as will be described later so as to form a linear image, and the rotating polygon mirror 356 as a light deflector for reflecting and deflecting the stimulating rays 352. The image read-out section 350 is also provided with a long mirror 357 for reflecting the deflected stimulating rays 352 so that the stimulating rays 352 scan the stimulable phosphor layer 322B of the stimulable phosphor sheet 322 in one direction and the drive rollers 358, 358 as the sub-scanning means composed of a pair of nip rollers for gripping the stimulable phosphor sheet 322 therebetween and rotated at a predetermined speed. The image read-out section 350 also comprises a long photomultiplier 359 positioned so that the light receiving face thereof extends along the scanning line (main scanning line) of the stimulating rays 352 on the stimulable phosphor sheet 322, and a long light guiding reflection mirror 360 extending along the long photomultiplier 359. Also, an f8 lens 361 and a cylindrical lens 362 are provided between the rotating polygon mirror 356 and the mirror 357 and the stimulating rays 352 are thereby made to converge to a predetermined beam diameter at every position on the stimulable phosphor sheet 322.

Figure 13:
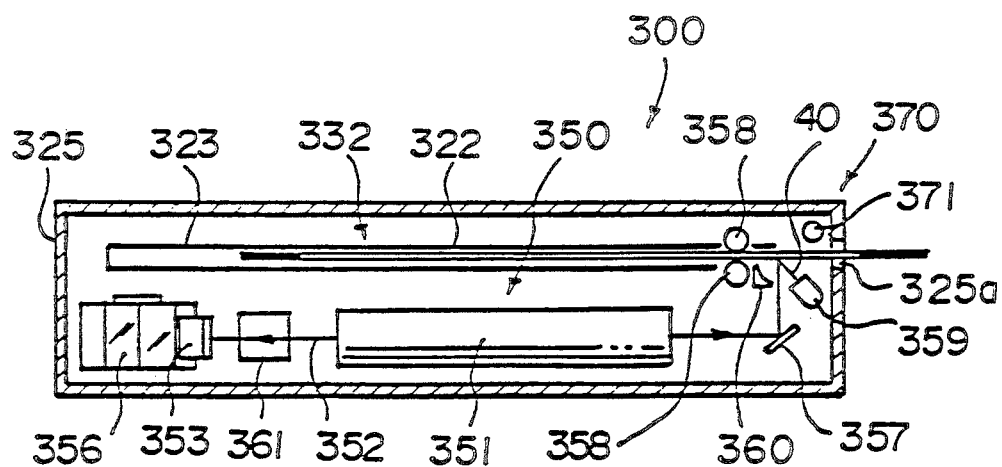

With reference to FIG. 13, after the radiation image of the object 11 has been stored on the stimulable phosphor sheet 322 in the manner as mentioned above, the drive rollers 358, 358 are rotated, and the stimulable phosphor sheet 322 is moved at a predetermined speed toward the opening 325a. In the course of the radiation image recording, the drive rollers 358, 358 grasp the holding portion 322a formed at one end of the stimulable phosphor sheet 322. Therefore, when the drive rollers 358, 358 are rotated after the image recording has been carried out, the stimulable phosphor sheet 322 can be immediately conveyed as mentioned above. Simultaneously with the conveyance of the stimulable phosphor sheet 322, the stimulating ray source 351 and the rotating polygon mirror 356 are activated, and the stimulating rays 352 scan on the stimulable phosphor sheet 322. The light 40 emitted by the stimulable phosphor sheet 322 is efficiently detected by the photomultiplier 359 directly or after being reflected by the light guiding reflection mirror 360. The scanning of the stimulating rays 352 in the main scanning direction is carried out in the manner as mentioned above and, at the same time, the stimulable phosphor sheet 322 is moved in the sub-scanning direction in the manner as mentioned above. Accordingly, the emitted light 40 is two-dimensionally read out from the stimulable phosphor sheet 322.

As shown in FIG. 13, when the stimulable phosphor sheet 322 is moved for the purpose of the subscanning, the stimulable phosphor sheet 322 is projected out of the case 325 through the opening 325a. Also, the stimulating rays 352 scan the stimulable phosphor sheet 322 at the position near the opening 325a. Therefore, at the time the image read-out has been finished, nearly the most part of the stimulable phosphor sheet 322 is projected out of the case 325. Accordingly, the case 325 need not be provided with a particular space for subscanning of the stimulable phosphor sheet 322, and may be formed in a size slightly larger than the size of the stimulable phosphor sheet 322.

At the time the image read-out has been finished in the manner as mentioned above, the holding portion 322c of the stimulable phosphor sheet 322 is grasped between the drive rollers 358, 358. Then, the drive rollers 358, 358 are rotated in the directions reverse to the directions of rotation at the time of the image read-out, and the stimulable phosphor sheet 322 is thereby returned to the image recording section 332 inside of the case 325. At this time, the stimulable phosphor sheet 322 passes over an erasing section 370 provided in the vicinity of the opening 325a in the case 325, and is subjected to the image (residual image) erasing. The erasing section 370 is constituted by an erasing light source 371 provided above the stimulable phosphor sheet 322.

In this manner, the stimulable phosphor sheet 322 on which the image (residual image) has been erased to such an extent that the stimulable phosphor sheet 322 becomes reusable for the radiation image recording is housed in the case 325. Therefore, the image recording and the image read-out can be repeated by use of the stimulable phosphor sheet 322. The erasing section 370 may also be constituted by disposing a surface type erasing light source, which may be an EL (electroluminescence) plate, so that it faces the stimulable phosphor sheet 322 at the image recording position from below, i.e. from the side of the stimulable phosphor layer 322B. In this case, the substrate 322A of the stimulable phosphor sheet 322 need not necessarily be formed of a transparent material. With this configuration, the aforesaid secondary erasing can be carried out easily by the utilization of the surface type erasing light source.

Embodiments of the second radiation image recording and read-out apparatus in accordance with the present invention will hereinbelow be described with reference to FIGS. 14 to 26.

Figure 14:
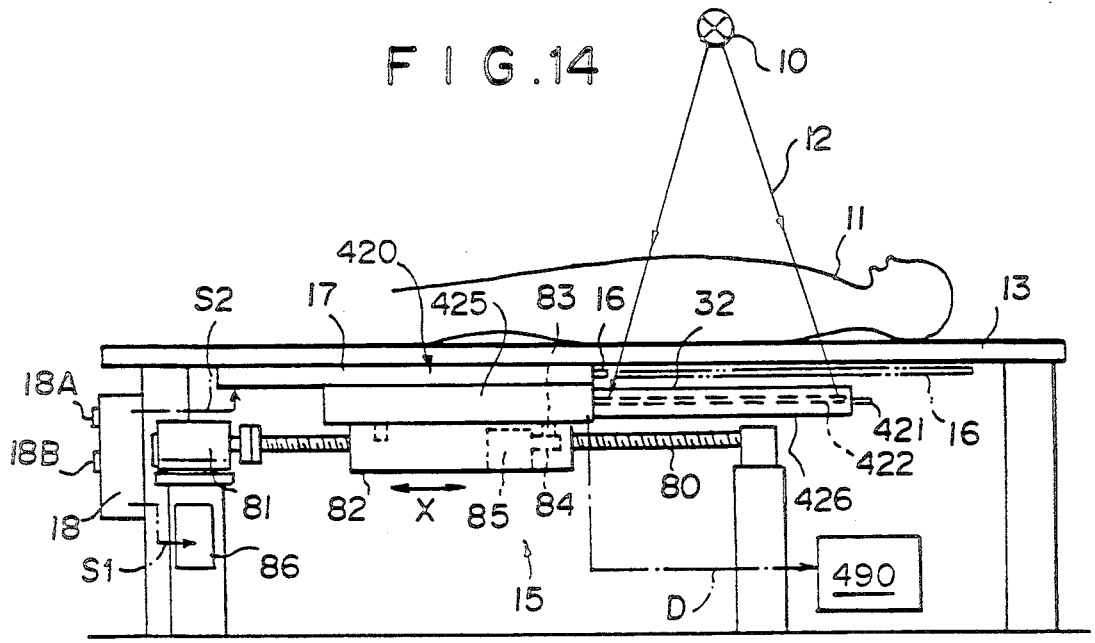
FIG. 14 is a schematic side view showing an embodiment of the second radiation image recording and read-out apparatus in accordance with the present invention.

With reference to FIG. 14, an embodiment of the second radiation image recording and read-out apparatus in accordance with the present invention is provided with the object support 13 for supporting the object 11 from below, a recording and read-out unit 420 provided at a position exposed to the radiation 12 such as X-rays produced by the radiation source 10 constituted by an X-ray tube or the like and passing through the object 11, and the unit movement means 15 for moving the recording and read-out unit 420 two-dimensionally (i.e. in the direction as indicated by the arrow X and in the direction normal thereto) in a horizontal plane along the object support 13. The embodiment is also provided with the shutter 16 formed of lead having a high radiation absorptivity and positioned between the recording and read-out unit 420 and the object support 13, the shutter operation means 17 for moving the shutter 16 in the direction as indicated by the arrow X, and the subdivision image recording controller 18. The unit movement means 15 is constituted by a plurality of the screw rods 80, 80, . . . extending in the direction as indicated by the arrow X, the motor 81 for rotating each of the screw rods 80, 80, . . . , the table 82 having female threads engaging with the screw rods 80, 80, . . . and moved in the direction as indicated by the arrow X by the rotation of the screw rods 80, 80, . . . , the rack 83 secured to the recording and read-out unit 420 and held on the table 82 moveably in the direction normal to the direction as indicated by the arrow X, i.e. for movement at an angle normal to the drawing sheet in FIG. 14, the pinion 84 engaged with the rack 83, the motor 85 for rotating the pinion 84 to move the rack 83 (and consequently, the recording and read-out unit 420) in the aforesaid direction, and the control section 86 for controlling the operations of the motors 81 and 85.

Figure 15:
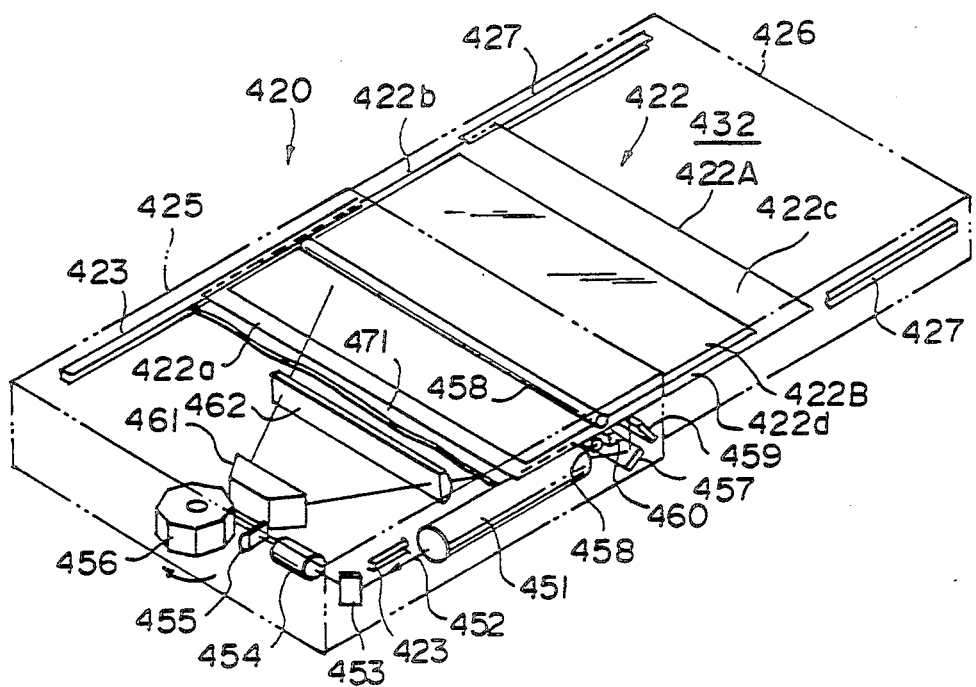
FIG. 15 is a perspective view showing the recording and read-out unit employed in the embodiment shown in FIG. 14, FIGS. 16 and 17 are sectional side views showing the conditions of the recording and read-out unit shown in FIG. 15 in the course of image recording and in the course of image read-out.

First, the recording and read-out unit 420 will be described below with reference to FIGS. 15 and 16. In a light-tight case 425, a stimulable phosphor sheet 422 composed of a plate-like substrate 422A and a stimulable phosphor layer 422B overlaid thereon is provided. The substrate 422A of the stimulable phosphor sheet 422 is formed to be larger than the stimulable phosphor layer 422B, and the portions of the substrate 422A around the stimulable phosphor layer 422B constitute holding portions 422a, 422b, 422c and 422d. In this embodiment, the stimulable phosphor sheet 422 is disposed so that the stimulable phosphor layer 422B comes under the substrate 422A, and is supported in the case 425 with the holding portions 422b and 422d being slideably supported on rails 423, 423. The longitudinal and transverse dimensions of the case 425 are adjusted to be slightly larger than those of the stimulable phosphor sheet 422.

As shown in FIG. 16, the case 425 is provided with an opening 425a at the case end on the right side, and a light shielding cover 426 housed in the case 425 is projectable out of the case 425 through the opening 425a. Though the light shielding cover 426 is manually projected out of the case 425 by gripping at a handle 421 in this embodiment, the light shielding cover 426 may instead be moved by a drive device and projected out of the case 425. The light shielding cover 426 is provided with a sheet passage opening 426a at one end, i.e. at the end on the side supported by the case 425 when the light shielding cover 426 is projected out of the case 425. Therefore, the inside of the light shielding cover 426 is communicated with the inside of the case 425 via the sheet passage opening 426a. At the time the light shielding cover 426 is housed in the case 425, the stimulable phosphor sheet 422 is positioned inside of the light shielding cover 426.

As shown in FIG. 16, in the use condition with the light shielding cover 426 pulled out of the case 425, the radiation source 10 constituted by an X-ray tube or the like and provided above the object support 13 faces the light shielding cover 426. The case 425 and the regions of the light shielding cover 426 outside of its upper surface 432 are lined with a radiation absorbing material such as a lead plate so that no fog is caused to arise on the stimulable phosphor sheet 422 by environmental radiations or the like other than the radiation used for the image recording.

In the course of the ordinary radiation image recording, the object 11 is made to lie, for example, on his back, on the object support 13, and the stimulable phosphor sheet 422 is conveyed by the rotation of drive rollers 458, 458 up to the image recording position completely contained in the light shielding cover 426 as shown in FIG. 16. Also, the shutter 16 is disposed at the retracted position upon which the radiation 12 produced by the radiation source 12 does not impinge, i.e. the position as indicated by the solid line in FIG. 14 at which the shutter 16 allows the radiation 12 to impinge upon approximately the overall surface of the stimulable phosphor sheet 422 inside of the light shielding cover 426. The radiation source 10 is activated in this condition, and the stimulable phosphor sheet 422 is exposed to radiation 12 produced by the radiation source 10 and passing through the object 11 to have a radiation image of the object 11 stored thereon, specifically on the stimulable phosphor layer 422B formed on the lower surface side of the stimulable phosphor sheet 422. In the light shielding cover 426, the stimulable phosphor sheet 422 is supported by rails 427, 427 approximately flush with the rails 423, 423 of the case 425. Thus, in this embodiment, an image recording section 440 is constituted by the rails 427, 427 for holding the stimulable phosphor sheet 422 at the image recording position and the upper surface 432 of the light shielding cover 426 which surface is permeable to the radiation 12.

Also, a grid for absorbing the radiation scattered by the object 11 or a bucky device provided with the grid and a means for reciprocally moving the grid may be provided above the stimulable phosphor sheet 422 in the light shielding cover 426.

An image read-out section 450 is provided at the lower part in the case 425. The image read-out section 450 is provided with a laser beam source 451, a mirror 453 for reflecting a laser beam 452 produced as stimulating rays by the laser beam source 451, a beam expander 454 for adjusting the beam diameter of the laser beam 452 to a predetermined value, a cylindrical lens 455 for making the laser beam 452 impinge upon a mirror surface of a light deflector 456 as will be described later so as to form a linear image normal to the rotation axis of the light deflector 456, and the light deflector 456 constituted by a rotating polygon mirror or the like for reflecting and deflecting the laser beam 452. The image read-out section 450 is also provided with a long mirror 457 for reflecting the deflected laser beam 452 so that the laser beam 452 scans the stimulable phosphor sheet 422, specifically the stimulable phosphor layer 422B thereof, in one direction, and the drive rollers 458, 458 as a read-out sub-scanning means composed of a pair of nip rollers for grasping the stimulable phosphor sheet 422 therebetween and rotated at a predetermined speed. The image read-out section 450 also comprises a long photomultiplier 459 as the photoelectric read-out means positioned so that the light receiving face thereof extends along the scanning lines (main scanning line) of the laser beam 452 on the stimulable phosphor sheet 422, and a long light guiding reflection mirror 460 extending along the long photomultiplier 459. Also, an fθ lens 461 and a cylindrical lens 462 are provided between the light deflector 456 and the mirror 457, and the laser beam 452 is thereby made to converge to a predetermined beam diameter at every position on the stimulable phosphor sheet 422.

With reference to FIG. 17, after the radiation image of the object 11 has been stored on the stimulable phosphor sheet 422 in the manner as mentioned above, the drive rollers 458, 458 are rotated, and the stimulable phosphor sheet 422 is moved at a predetermined speed from the light shielding cover 426 into the case 425. In the course of the radiation image recording, the drive rollers 458, 458 grasp the holding portion 422a formed at one end of the stimulable phosphor sheet 422. Therefore, when the drive rollers 458, 458 are rotated after the image recording has been carried out, the stimulable phosphor sheet 422 can be immediately conveyed as mentioned above. Simultaneously with the conveyance of the stimulable phosphor sheet 422, the laser beam source 451 and the light deflector 456 are activated, and the laser beam 452 scans on the stimulable phosphor sheet 422. As the stimulable phosphor sheet 422 is exposed to the laser beam 452, the exposed portion of the stimulable phosphor sheet 422 emits light 463 carrying the radiation image stored thereon. The emitted light 463 is efficiently detected by the long photomultiplier 459 directly or after being reflected by the light guiding reflection mirror 460. The scanning of the laser beam 452 in the main scanning direction is carried out in the manner as mentioned above and, at the same time, the stimulable phosphor sheet 422 is moved in the sub-scanning direction in the manner as mentioned above. Accordingly, the emitted light 463, i.e. the radiation image, is two-dimensionally read out from the stimulable phosphor sheet 422. The read-out image signals generated by the long photomultiplier 459 are amplified, digitized and subjected to processing such as image processing in a read-out circuit 464. The digital read-out image signals D thus obtained are sent to an image reproducing apparatus 490 as shown in FIG. 14 and used for reproduction of the radiation image. The image reproducing means 490 may be a display means such as a CRT, or a recording apparatus for carrying out light beam scanning recording on a photosensitive film, or may be replaced by a device for storing the image signals on an image file such as an optical disk or a magnetic disk. Also, the image signals may be sent to a remote position, where personnel and instruments for medical examination are present, through radio communication and used for radiation image reproduction and diagnosis.

As shown in FIG. 17, when the stimulable phosphor sheet 422 is moved by the drive rollers 458, 458 for the purpose of the sub-scanning, the stimulable phosphor sheet 422 passes through the sheet passage opening 426a and enters the case 425 from the light shielding cover 426. Also, the laser beam 452 scans the stimulable phosphor sheet 422 at the position near the opening 425a of the case 425. At the time the image read-out has been finished, the stimulable phosphor sheet 422 is positioned inside of the case 425. Therefore, the case 425 need not be provided with a particular space for sub-scanning of the stimulable phosphor sheet 422, and may be formed in a size slightly larger than the size of the stimulable phosphor sheet 422 as mentioned above.

At the time the image read-out has been finished in the manner as mentioned above, the holding portion 422c of the stimulable phosphor sheet 422 is held between the drive rollers 458, 458, and the stimulable phosphor sheet 422 is supported by the rails 423, 423. An erasing section 470 is provided below the stimulable phosphor sheet 422 in this condition. The erasing section 470 is constituted, by way of example, by a surface type erasing light source 471 facing the stimulable phosphor sheet 422 from below. The erasing light source 471 is constituted by, for example, an LED panel or an EL (electroluminescence) plate, and mainly emits the erasing light having a wavelength within the stimulation wavelength range for the stimulable phosphor constituting the stimulable phosphor sheet 422. The erasing light source 471 is turned on at the time the image readout from the stimulable phosphor sheet 422 is finished. As the stimulable phosphor sheet 422, specifically the stimulable phosphor layer 422B, is exposed to the erasing light, the radiation energy remaining on the stimulable phosphor sheet 422 after the image read-out therefrom has been finished is released therefrom.

In this manner, the stimulable phosphor sheet 422 on which the image (residual image) has been erased to such an extent that the stimulable phosphor sheet 422 becomes reusable for the radiation image recording is housed in the case 425. Therefore, the image recording and the image read-out can be repeated by use of the erased reusable stimulable phosphor sheet 422. As the erasing light source 471, a tungsten-filament lamp, a halogen lamp, an infrared lamp, a xenon flash lamp, a fluorescent lamp or the like as well as the aforesaid surface type light source constituted by the LED panel or the like. In the case where such a lamp is employed as the erasing light source, in order to expose the overall area of the stimulable phosphor sheet 422 standing stationary in the case 425, a plurality of the lamps may be disposed side by side, or a rod-like light source may be positioned in the vicinity of the drive rollers 458, 458 therealong for irradiating the erasing light to the stimulable phosphor sheet 422 conveyed from the case 425 into the light shielding cover 426 prior to the next radiation image recording. In the case where the residual image erasing is carried out in the course of the conveyance of the stimulable phosphor sheet 422 in this manner, the substrate 422A of the stimulable phosphor sheet 422 may be formed of a transparent material, and the erasing light may be irradiated to the stimulable phosphor layer 422B via the substrate 422A from above the stimulable phosphor sheet 422.

Figure 18:
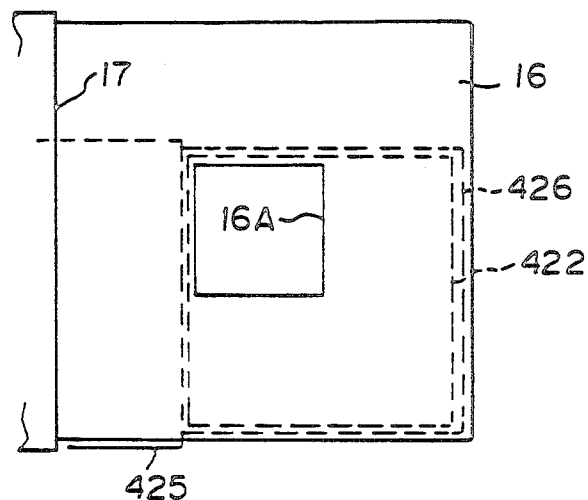
FIG. 18 is a plan view showing the conditions of the shutter and the recording and read-out unit in the embodiment shown in FIG. 14 in the course of subdivision image recording.

The subdivision image recording with the embodiment shown in FIG. 14 will be described hereinbelow. When an operation pushbutton 18A of the subdivision image recording controller 18 is depressed to instruct the subdivision image recording, the operation control signals S1 and S2 are sent from the subdivision image recording controller 18 to the unit movement means 15 and the shutter operation means 17. Upon receiving the operation control signal S2, the shutter operation means 17 projects the shutter 16 rightward in FIG. 14 to the masking position (the position as indicated by the chain line in FIG. 14) at which the middle of the shutter 16 exactly faces the radiation source 10. As shown in FIG. 18, the shutter 16 has the square opening 16A at the middle, and the size of the opening 16A is adjusted to be approximately a quarter of the stimulable phosphor sheet 422 in the light shielding cover 426. On the other hand, the control section 86 of the unit movement means 15 receives the operation control signal S1, and operates the motors 81 and 85 to move the recording and read-out unit 420 to such a position (the position as shown in FIG. 18) that the approximately quarter region of the stimulable phosphor sheet 422 in the light shielding cover 426 faces the opening 16A. In this condition, the radiation source 10 is activated, only the radiation 12 passing through the opening 16A of the shutter 16 impinges upon the stimulable phosphor sheet 422, and a radiation image of the object 11 is stored on the quarter region 1A of the stimulable phosphor sheet 422 as shown in FIG. 8.

By way of example, when another operation pushbutton 18B of the subdivision image recording controller 18 is depressed, the unit movement means 15 moves the recording and read-out unit 420 leftward in FIG. 18 until another quarter region 1B of the stimulable phosphor sheet 422 as shown in FIG. 8 faces the opening 16A. In this condition, the radiation source 10 is activated, and a radiation image of the object 11 is stored on the quarter region 1B in the same manner as mentioned above.

Thereafter, the movement of the recording and read-out unit 420 and the operation of the radiation source 10 are repeated in the same manner as mentioned above, and the subdivision image recording can thus be carried out at quarter regions 1C and 1D of the stimulable phosphor sheet 422 as shown in FIG. 8. Instead of using all of the quarter regions 1A to 1D, the image recording may be carried out by use of three or less of the quarter regions 1A to 1D. Also, instead of manually operating the operation pushbutton 18B, detection signals for the operation of the radiation source 10 may be fed to the subdivision image recording controller 18, so that the recording and read-out unit 420 is automatically moved each time a single image recording step is finished.

When a signal representing the completion of the aforesaid subdivision image recording is fed to the subdivision image recording controller 18, by way of example, manually, the unit movement means 15 and the shutter operation means 17 are operated under the control by the subdivision image recording controller 18, so that recording and read-out unit 420 is returned to the position at which the middle of the light shielding cover 426 exactly faces the radiation source 10, and the shutter 16 is returned to the aforesaid retracted position. Also, the portion of the stimulable phosphor sheet 422 at which the subdivision image recording has been carried out is sent to the image read-out section 450 in the same manner as in the aforesaid ordinary image recording, and the radiation images recorded by the subdivision image recording are read out from the stimulable phosphor sheet 422. The radiation images thus read out are displayed or reproduced into visible images in the same format as the subdivision image recording format on the image reproducing apparatus 490 shown in FIG. 14.

Instead of constituting the embodiment to carry out the four-on-one subdivision image recording as mentioned above, the second radiation image recording and read-out apparatus in accordance with the present invention may also be constituted for carrying out two-on-one subdivision image recording, three-on-one subdivision image recording or the subdivision image recording in different formats. For example, in the case where the two-on-one subdivision image recording is to be carried out, the shutter 16 need not be provided with the opening 16A and may be formed movably between the masking position at which the shutter 16 covers approximately one-half part of the stimulable phosphor sheet 422 in the light shielding cover 426 and the position retracted completely from the position facing the light shielding cover 426.

In the embodiment shown in FIG. 14, the stimulable phosphor sheet 422 is moved with respect to the shutter 16 by moving the recording and read-out unit 420 as a whole for the purpose of the subdivision image recording. However, in the case where the subdivisions on the stimulable phosphor sheet 422 are formed to stand side by side only in a single direction from right to left in FIG. 14, the stimulable phosphor sheet 422 may be moved in the light shielding cover 426 by utilizing the drive rollers 458, 458. In the case where the subdivision image recording is carried out by dividing the image recording region on the stimulable phosphor sheet 422 in the longitudinal and transverse directions as in the case of the four-on-one subdivision image recording, the movement of the stimulable phosphor sheet 422 in the direction from right to left in FIG. 14 may be carried out by use of the drive rollers 458, 458, and the sheet movement normal to said direction may be carried out by moving the recording and read-out unit 420 as a whole.

Figure 19:
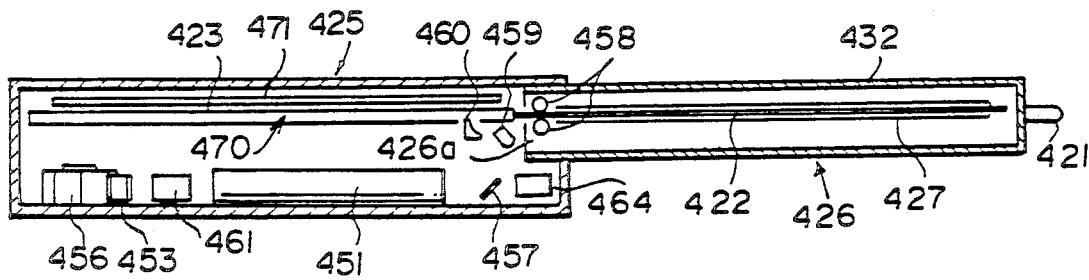
FIGS. 19, 20, 21, 22, 23 and 24 are sectional side views showing the recording and read-out units in further embodiments of the second radiation image recording and read-out apparatus in accordance with the present invention.

As in an embodiment shown in FIG. 19, in the case where the substrate 422A is formed of a transparent material, the surface type erasing light source 471 may be disposed on the side opposite to the image read-out section 450 with respect to the stimulable phosphor sheet 422. In FIG. 19, similar elements are numbered with the same reference numerals with respect to FIGS. 14 to 17. Though only the recording and read-out unit is shown in FIG. 19, the other mechanisms may be formed in the same manner as in FIG. 14. This also applied to the embodiments described below.

Figure 20:
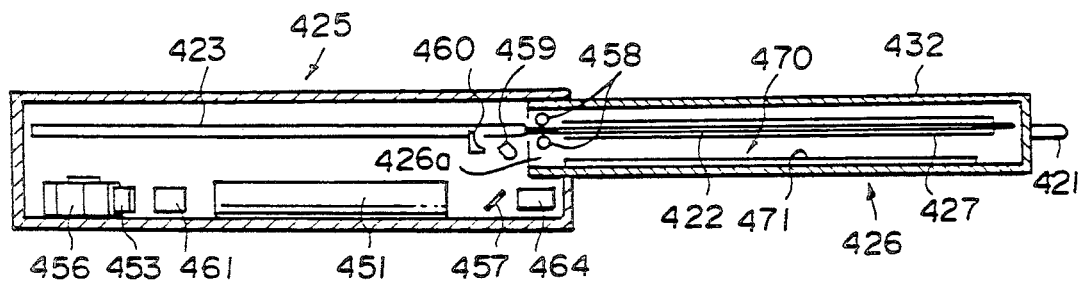
Figure 21:
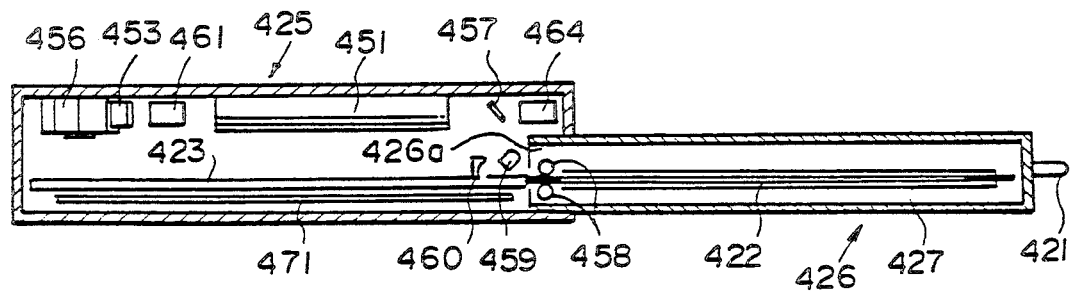

Also, as in an embodiment shown in FIG. 20, the erasing light source 471 may be provided inside of the light shielding cover 426, instead of being disposed inside of the case 425.

In the case where the stimulable phosphor sheet 422 has been stored in the case 425 without being used for a long period after being subjected to the image (residual image) erasing at the erasing section 470, the stimulable phosphor sheet 422 stores energy of radiations emitted by radioactive isotopes such as Ra226, which are contained as impurities in the stimulable phosphor, or energy of environmental radiations. These types of radiation energy undesirably stored on the stimulable phosphor sheet 422 cause noise in a radiation image recorded next on the stimulable phosphor sheet 422. Exactly prior to the image recording, such radiation energy is erased by exposing the stimulable phosphor sheet 422 to the erasing light produced by the erasing light source 471. Also, in the case where the surface type erasing light source is used, instead of carrying out the image (residual image) erasing immediately after the stimulable phosphor sheet 422 on which the image read-out has been finished is returned into the case 425, the erasing may be carried out exactly prior to the next radiation image recording, thereby to perform the residual image erasing and the secondary erasing by a single erasing step. In this case, the radiation energy as the residual image component remaining on the stimulable phosphor sheet 422 is naturally released to some extent by its decay characteristics, and therefore the amount of the erasing light for the residual image erasing can be decreased.

In the aforesaid embodiment, the image read-out is carried out from the side opposite to the radiation irradiating side with respect to the stimulable phosphor sheet 422. However, it is also possible to carry out the image read-out from the same side as the radiation irradiating side by irradiating the laser beam 452 from the radiation irradiating side with respect to the stimulable phosphor sheet 422, and disposing the stimulable phosphor sheet 422 with the stimulable phosphor layer facing the radiation irradiating side. Also, after the image recording step, the stimulable phosphor sheet 422 may be quickly returned into the case 425, and then moved from the case 425 into the light shielding cover 426 for carrying out the image read-out. In this case, the stimulable phosphor sheet 422 prior to the image read-out step is quickly retracted from the position facing the radiation-permeable upper surface 432 of the light shielding cover 426, and therefore the stimulable phosphor sheet 422 can be prevented from the formation of fog caused by environmental radiations or the like.

On the other hand, in order to eliminate various influences caused by variations in image recording conditions and/or to obtain a radiation image having a high image quality or a high diagnostic efficiency and accuracy, it is desired to ascertain such image input conditions of the radiation image stored on the stimulable phosphor sheet 422 as, for example, the level of radiation dose used for image recording, or the image input pattern which is determined by the portion of the object 11 (e.g. the chest or the abdomen of the human body) or the image recording method used, such as plain image-recording or contrasted image recording, before reproducing the radiation image to a visible image, and then to adjust the read-out conditions in the read-out circuit 464 such as the read-out gain and the scale factor to appropriate values, and/or to carry out an appropriate image processing, based on the ascertained image input conditions or the image input pattern. The image input conditions and the image input pattern will hereinafter be simply referred to as the image input information when they are referred to generically. Ascertaining of the image input information may be carried out prior to the visible image reproduction by use of the method as disclosed in Japanese Unexamined Patent Publication No. 58(1983)-67240 which corresponds to U.S. Pat. No. 4,527,060. In the disclosed method, a read-out operation for ascertaining the image input information of a radiation image stored on the stimulable phosphor sheet 422 (hereinafter referred to as the preliminary read-out) is carried out in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out conditions such as the read-out gain and the scale factor are adjusted to appropriate values, and/or an appropriate image processing is carried out, on the basis of the image input information obtained by the preliminary read-out. Also in the embodiments described above with reference to FIGS. 14 to 21, the preliminary read-out and the final read-out can be carried out easily. Specifically, the preliminary read-out is first carried out while the stimulable phosphor sheet 422 is being conveyed from the light shielding cover 426 to the case 425, the stimulable phosphor sheet 422 is then returned into the light shielding cover 426 (at this time, the erasing light source 471 is not turned on), and thereafter the final read-out is carried out while the stimulable phosphor sheet 422 is being conveyed from the light shielding cover 426 to the case 425. Instead of returning the stimulable phosphor sheet 422 to the light shielding cover 426, the sheet may also be conveyed from the case 425 to the light shielding cover 426 after the preliminary read-out is finished, and the final read-out may be carried out in the course of said conveyance.

Figure 22:
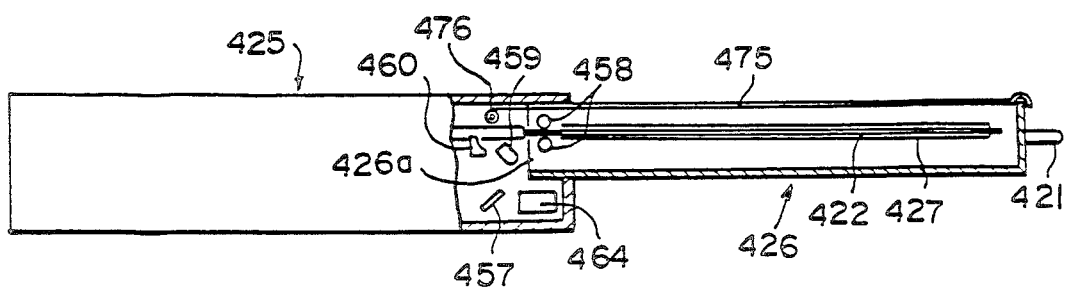
Figure 23:
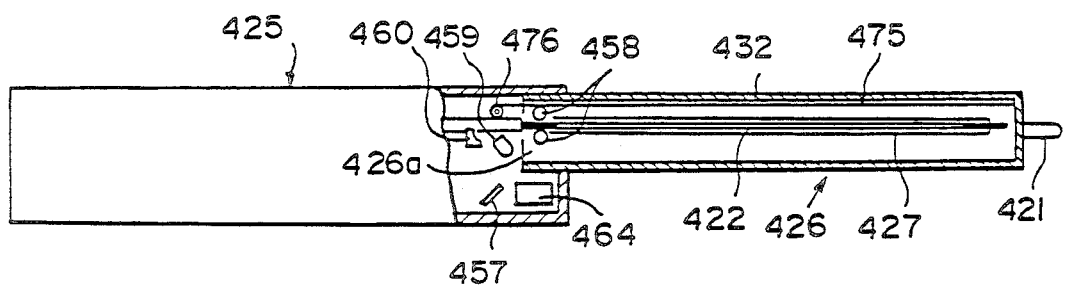
Figure 24:
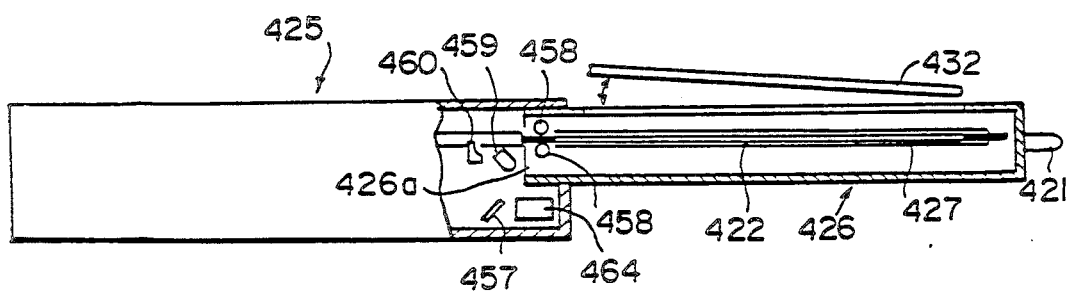

Instead of providing the erasing light source 471 inside of the case 425 or inside of the light shielding cover 426 as in the aforesaid embodiments, it is also possible to utilize indoor illumination light as the erasing light. FIGS. 22, 23 and 24 shows such embodiments.

With reference to FIG. 22, the upper side of the light shielding cover 426 is opened, and a light shielding screen 475 is provided at the opened side. The light shielding screen 475 is wound up by a wind-up device 476 inside of the case 425 prior to the radiation image recording to lay bare the stimulable phosphor sheet 422 inside of the light shielding cover 426. The bared sheet 422 is subjected to the residual image erasing and/or the secondary erasing by the indoor illumination light. After the erasing is carried out, the light shielding screen 475 is moved to close the upper side of the light shielding cover 426 so that the stimulable phosphor sheet 422 is not exposed to ambient light.

In the embodiment shown in FIG. 23, the upper surface 432 of the light shielding cover 426 is formed of a transparent member, and the light shielding screen 475 is positioned between the upper surface 432 and the stimulable phosphor sheet 422. The light shielding screen 475 is wound up and delivered by the wind-up device 476.

In the embodiment shown in FIG. 24, the upper surface 432 of the light shielding cover 426 is mounted removably. In this embodiment, the stimulable phosphor sheet 422 in the light shielding cover 426 is bared by removing the upper surface 432. The bared stimulable phosphor sheet 422 may then be subjected to the residual image erasing and/or the secondary erasing by the indoor illumination light. In the case where the indoor illumination light is utilized as the erasing light, though the erasing can be effected only by use of the indoor light, a long time will be taken for the erasing only with the indoor light. Therefore, a small-scale erasing light source should preferably be provided in the apparatus, and the erasing should be carried out by use of the light produced by the erasing light source and the indoor light, thereby to shorten the erasing time.

The long photomultiplier 459 is described in detail in, for example, Japanese Unexamined Patent Publication No. 62(1987)-16666, which corresponds to application Ser. No. 141,259 (Con. application of U.S. Ser. No. 884,628), now U.S. Pat. No. 4,864,134 and will now be described briefly with reference to FIGS. 25A, 25B and 26. The long photomultiplier 459 shown in FIGS. 25A and 25B has an electrode configuration generally referred to as the box type. The photomultiplier 459 comprises a vacuum body 151 fabricated of glass or the like, a photocathode (photoelectric face) 153 disposed to face a long light receiving face 152 for producing photoelectrons in the vacuum body 151, and a multiplying section 167 disposed under the photocathode 153 in the vacuum body 151 and including a plurality (13 pieces in this example) of electrodes (dynodes) 154 through 166 having a quarter cylinder shape and exhibiting the secondary electron emission effect. A shield electrode 168 is disposed to face the lowermost dynode 166 of the multiplying section 167, and an anode 169 for collecting the electron streams multiplied by the multiplying section 167 and generating a signal is positioned inside of the shield electrode 168. These electrodes are respectively connected electrically in one-to-one relation with terminals 172, 172, ... of a terminal group 170 disposed on the side opposite to the light receiving face 152. The dynodes 154 through 166 and the shield electrode 168 are secured inside of the body 151 by supporting members 171, 171, 171 fabricated of an insulating material. The shield electrode 168 need not necessarily be provided.

Figure 26:
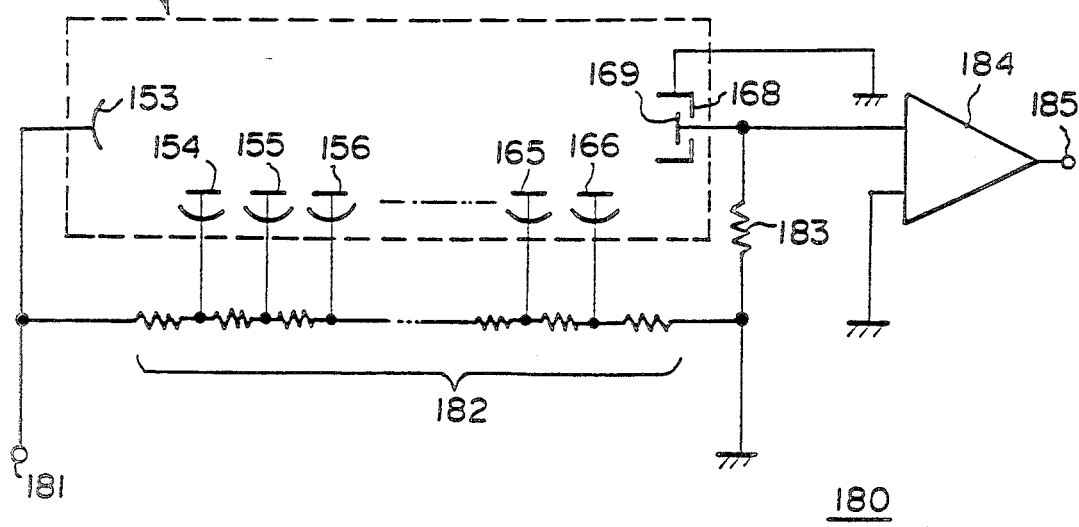
FIG. 26 is a circuit diagram showing the drive circuit for the photomultiplier shown in FIG. 25A.

FIG. 26 shows an electric circuit for operating the photomultiplier 459 and obtaining a photoelectric output. In FIG. 26, similar elements are numbered with the same reference numerals with respect to FIGS. 25A and 25B. A high negative voltage is applied to the photocathode 153 via a high negative voltage applying terminal 181. The high negative voltage applied to the high negative voltage applying terminal 181 is divided by a bleeder resistance group 182 into voltages which are applied respectively to the dynodes 154 through 166. The shield electrode 168 is grounded, and the anode 169 is grounded via a resistor 183 and is connected with one of terminals of an amplifier 184. The other terminal of the amplifier 184 is grounded. The photoelectrically converted image information is obtained as electric signals from an output terminal 185 of the amplifier 184. As the long photomultiplier 459, it is also possible to employ the photomultiplier having the electrode configuration generally referred to as the venetian blind type as described in, for example, Japanese Unexamined Patent Publication No. 62(1987)-16666 which corresponds to U.S. application Ser. No. 141,259 (Con. application of U.S. Ser. No. 884,628), now U.S. Pat. No. 4,864,134.

Also, the photoelectric read-out means used in the present invention is not limited to the long photomultiplier 459. By way of example, a photoelectric read-out means composed of a photodetector having a comparatively small light receiving face and a light guide member optically coupled with each other as disclosed in, for example, Japanese Unexamined Patent Publication No. 59(1984)-192240 which corresponds to U.S. application Ser. No. 037,119 (Con. application of U.S. Ser. No. 600,689), now U.S. Pat. No. 4,851,679 may also be used. However, the long photomultiplier 459 is advantageous since it eliminates the problems with regard to an increase in the apparatus size caused by the use of the large light guide member, a decrease in the light detection efficiency caused by leak of the light emitted by the stimulable phosphor sheet from the light guide member, and an increase in the cost of the apparatus caused by the formation of the light guide member having a complicated shape. Also, in the case where the long photomultiplier 459 is utilized, the light guiding efficiency can be improved by combination with the light guiding reflection mirror 460, combination with an integrating cylinder as disclosed in Japanese Unexamined Patent Publication No. 62(1987)-16668, which corresponds to U.S. Pat. No. 4,799,591 or combination with the integrating cylinder and the reflection optical element as disclosed in Japanese Unexamined Patent Publication No. 62(1987)-16669 which corresponds to U.S. Pat. No. 4,799,591.

We claim:

1. A radiation image recording and read-out apparatus which comprises:
   (i) a recording and read-out unit provided with:
     a) a case for housing therein a stimulable phosphor sheet and having longitudinal and transverse dimensions approximately equal to the longitudinal and transverse dimensions of a single image recording area on said stimulable phosphor sheet, b) an image recording section for holding said stimulable phosphor sheet in said case at an image recording position exposed to radiation passing through an object, and having a radiation image of said object stored on said stimulable phosphor sheet, c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and d) an erasing section provided in said case for releasing the radiation energy remaining on said stimulable phosphor sheet, for which the detection of said emitted light has been carried out, before the image recording is carried out on said stimulable phosphor sheet, ii) a shutter provided on a radiation incidence side with respect to said stimulable phosphor sheet held at said image recording position, having a size covering at least a part of said stimulable phosphor sheet, and moveable between a masking position at which said shutter prevents impingement of the radiation upon a part of said stimulable phosphor sheet and a retracted position at which said shutter allows impingement of the radiation upon approximately the overall area of the single image recording region of said stimulable phosphor sheet, iii) a shutter operation means operated from the exterior for moving said shutter between said masking position and said retracted position, iv) a unit movement means for moving said recording and read-out unit so that said stimulable phosphor sheet at said image recording position is moved approximately in the same plane, and v) a subdivision image recording operation means for, upon receiving a subdivision image recording instruction, operating said shutter operation means to move said shutter to said masking position, and operating said unit movement means to move said recording and read-out unit so that the uncovered portion of said stimulable phosphor sheet at said image recording position that is not covered by said shutter changes sequentially;

wherein said stimulable phosphor sheet is shaped in an endless belt-like form, said stimulable phosphor sheet in the endless belt-like form is held at said image recording position by being applied around two sets of roller sections which are spaced from each other by a distance approximately equal to the length of a single image area, and in the course of feeding the image-recorded portion of said stimulable phosphor sheet out of said image recording position and feeding a different portion of said stimulable phosphor sheet to said image recording position, said stimulating rays are scanned in a sub-scanning direction by the movement of said stimulable phosphor sheet, whereby the detection of said light emitted by said stimulable phosphor sheet is carried out.

2. A radiation image recording and read-out apparatus which comprises:

i) a recording and read-out unit provided with:

a) a case for housing therein a stimulable phosphor sheet and having longitudinal and transverse dimensions approximately equal to the longitudinal and transverse dimensions of a single image recording area on said stimulable phosphor sheet, b) an image recording section for holding said stimulable phosphor sheet in said case at an image recording position exposed to radiation passing through an object, and having a radiation image of said object stored on said stimulable phosphor sheet, c) an image read-out section provided in said case for exposing said stimulable phosphor sheet carrying said radiation image stored thereon to stimulating rays which cause said stimulable phosphor sheet to emit light in proportion to the stored radiation energy, and photoelectrically detecting the emitted light to obtain image signals, and d) an erasing section provided in said case for releasing the radiation energy remaining on said stimulable phosphor sheet, for which the detection of said emitted light has been carried out, before the image recording is carried out on said stimulable phosphor sheet, ii) a shutter provided on a radiation incidence side with respect to said stimulable phosphor sheet held at said image recording position, having a size covering at least a part of said stimulable phosphor sheet, and moveable between a masking position at which said shutter prevents impingement of the radiation upon a part of said stimulable phosphor sheet and a retracted position at which said shutter allows impingement of the radiation upon approximately the overall area of the single image recording region of said stimulable phosphor sheet, iii) a shutter operation means operated from the exterior for moving said shutter between said masking position and said retracted position, iv) a unit movement means for moving said recording and read-out unit so that said stimulable phosphor sheet at said image recording position is moved approximately in the same plane, and (v) a subdivision image recording operation means for, upon receiving a subdivision image recording instruction, operating said shutter operation means to move said shutter to said masking position, and operating said unit movement means to move said recording and read-out unit so that the uncovered portion of said stimulable phosphor sheet at said image recording position that is not covered by said shutter changes sequentially;

wherein said stimulable phosphor sheet is secured at said image recording position;

said image read-out section and said erasing section are provided on a moveable body for movement along the surface of said stimulable phosphor sheet, and said stimulating rays are scanned in a subscanning direction by the movement of said moveable body, thereby to carry out the detection of said light emitted by said stimulable phosphor sheet, and the image erasing is carried out by the movement of said moveable body.

* * * * *